(12) United States Patent
Mizutani et al.

(10) Patent No.: US 7,554,697 B2
(45) Date of Patent: Jun. 30, 2009

(54) IMAGE FORMING APPARATUS, IMAGE FORMING METHOD, AND IMAGE FORMING PROGRAM

(75) Inventors: Toshiyuki Mizutani, Hino (JP); Kenichirou Hiramoto, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 596 days.

(21) Appl. No.: 11/351,377

(22) Filed: Feb. 10, 2006

(65) Prior Publication Data
US 2006/0181738 A1    Aug. 17, 2006

(30) Foreign Application Priority Data
Feb. 14, 2005   (JP) .............................. 2005-036246

(51) Int. Cl.
*H04N 1/405* (2006.01)
(52) U.S. Cl. .............................. 358/3.12; 347/6; 347/15; 347/43; 358/1.2; 358/1.9; 358/3.05; 358/3.06; 358/3.13
(58) Field of Classification Search .............. 347/6, 347/15, 43; 358/1.2, 1.9, 3.05–3.06, 3.13
See application file for complete search history.

(56) References Cited

U.S. PATENT DOCUMENTS

| | | | | |
|---|---|---|---|---|
| 5,721,625 A | * | 2/1998 | Furusawa et al. .......... 358/3.14 |
| 6,031,627 A | * | 2/2000 | Kakutani ..................... 358/1.9 |
| 6,099,105 A | * | 8/2000 | Kakutani ..................... 347/15 |
| 6,338,538 B1 | * | 1/2002 | Toshiaki ....................... 347/15 |
| 2004/0017415 A1 | * | 1/2004 | Nunokawa ................... 347/15 |
| 2006/0262329 A1 | * | 11/2006 | Fujimori ..................... 358/1.2 |

FOREIGN PATENT DOCUMENTS

JP    2003-501300    1/2003

* cited by examiner

*Primary Examiner*—Mark K Zimmerman
*Assistant Examiner*—Dung D Tran
(74) *Attorney, Agent, or Firm*—Lucas & Mercanti, LLP

(57) ABSTRACT

An image forming apparatus, for forming an image with using distributions of two or more types of dots having different densities per unit area in a same hue, including: a threshold value matrix; and a dot formation determining section for carrying out comparison between a pixel value at a target pixel in the input image and a threshold value corresponding to the target pixel in the threshold value matrix, and for determining, whether to form or not to form any one of the two or more types of dots, wherein threshold values in the threshold value matrix are configured so that a frequency of dot formation is lower, for gradation regions in which a dot density of any of the two or more types of dots is low and/or high, than that for gradation regions in which the dot density is in average level.

20 Claims, 13 Drawing Sheets

IMAGE FORMING APPARATUS, IMAGE FORMING METHOD, AND IMAGE FORMING PROGRAM

This application is based on Japanese Patent Application No. 2005-036246 filed with Japan Patent Office on Feb. 14, 2005, the entire content of which is hereby incorporated by reference.

BACKGROUND OF THE INVENTION

1. Field of Technology

The present invention relates to image forming apparatuses, image forming methods, and image forming programs, and in particular, to image forming apparatuses, image forming methods, and image forming programs for forming images using distributions of two or more types of dots with different densities per unit area in the same hue.

2. Description of the Related Technology

Conventionally, printers using the three colors of cyan (C), magenta (M), and yellow (Y), or, printers using inks of four colors CMYK with ink of black (K) color added to said three colors have been known as the printing apparatuses that print images from a personal computer, etc. Such printers form images by the ON/OFF control of dots of the respective colors obtained by halftoning.

In contrast with this, in recent years, in order to obtain high image quality output images, many printers have been introduced that carry out printing using inks of different densities (e.g. dark colored ink and light colored ink) are used or different ink dot diameters are utilized so that a dot having a plurality of gradation levels in one hue is formed.

However, one of the typical methods of halftoning is a dither method. This method is one that establishes a one to one correspondence between the pixel value of the input image and one pixel of the threshold value matrix, and the output signal is made ON (the dot is formed) if the pixel value of the input image is higher than the threshold value of the threshold value matrix, and the output signal is made OFF (the dot is not formed) if the threshold value of the threshold value matrix is higher.

When the number of pixels constituting this threshold value matrix is m×n and there are t number of types of threshold values allocated to them, in the case of a common threshold value matrix, very often (m×n)/t of the respective threshold old values will be present. For example, if the number of types of threshold values allocated to a pixel of a threshold value matrix of 64×64 pixels is 256 types (when the threshold value matrix has an 8-bit resolution), each value will be present 16 times.

Although this method is extremely fast and does not generate pseudo-outlines in the case of judging the presence or absence of the formation of one type of dot with one type of input value and one type of threshold value matrix, in the case of judging the presence or absence of the formation of two or more types of dots with one type of input value and one type of threshold value matrix (see, for example, Patent Document 1), there was the problem that, at a dot rate of realizing at least one type of dot, discontinuous points will be generated, and as a result, pseudo-outlines were easy to be generated.

In view of this, methods are being thought of for preventing the generation of pseudo-outline in the case of judging the presence or absence of the formation of two or more types of dots having different densities per unit area, and different methods have been proposed.

Incidentally, "dots having different densities per unit area" includes in addition to the dots having different optical densities such as dark dot, mid dark dot and light dots, the dots having different dot sizes such as large dot, middle dot and small dot, and combinations of different optical density dots and different sized dots such as dark dot and small dot, or large dot and light dot.

Patent Document 1: Japanese Translation of PCT International Application Publication No. 2003-501300

However, in the conventional methods that have been proposed for preventing the generation of pseudo-outlines, it is not possible to fully correct pseudo-outlines, and the measures were insufficient.

SUMMARY OF THE INVENTION

Therefore, an object of the present invention is to provide an image forming apparatus, an image forming method, and an image forming program that can make the dot dispersion good while preventing the generation of pseudo-outlines when forming images using two or more types of dots with different densities per unit area within the same hue.

One of the structures for achieving the above object is image forming apparatus, for forming an image with using distributions of two or more types of dots having different densities per unit area in a same hue, comprising:

a threshold value matrix having a size of a prescribed region smaller than an input image; and a dot formation determining section for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining section comprises:

a first dot formation determining section for comparing the pixel value with the threshold value allocated at a position corresponding to the target pixel, and determining whether to form a first type of dot among the two or more types of dots; and a second dot formation determining section for determining whether or not to form a second type of dot among the two or more types of dots at a position where the first dot formation determining section has determined not to form the first type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level.

Herein, the dot density is defined as a ratio of a number of pixels in which a dot is generated within a unit number of pixels.

DETAILED DESCRIPTION OF THE PREFERRED EMBODIMENTS

Figure 1:
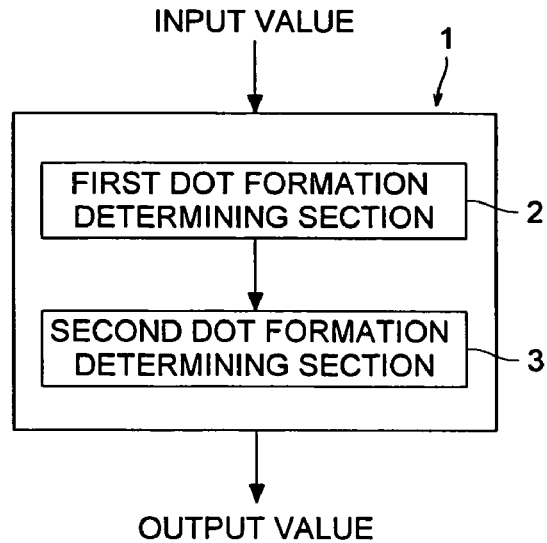
FIG. 1 is a block diagram showing the outline configuration of an image forming apparatus according to the present invention.

Referring to the drawings, the following describes the image forming apparatus image forming method and image forming program of the present invention, without the present invention being restricted to the examples given in the drawings.

Embodiment 1

In the first place, the first embodiment will be described with reference to FIGS. 1 through 9.

FIG. 1 is a block diagram representing the schematic configuration of an image forming apparatus 1 as a first embodiment of the present invention;

The image forming apparatus 1 can be mounted on an output apparatus (image recording means) such as an inkjet printer known in the prior art. It quantizes, for each pixel, the input value composed of multi-gradation image data where each pixel constituting the image is assigned with the image data having a predetermined number of bits (a predetermined number of gradations), and converts the result into the output value composed of pseudo-halftone image data.

As shown in FIG. 1, the image forming apparatus 1 is equipped with: a first dot formation determining section 2 for implementing the first dot formation determining function in the first dot formation determining step to be described later; a second dot formation determining section 3 for implementing the second dot formation determining function in the second dot formation determining step.

The image forming apparatus 1 comprises a CPU (Central Processor Unit), ROM (Read Only Memory), RAM (Random Access Memory) etc. In the image forming apparatus 1, an image forming program for processing the image data is stored in the ROM. Using the RAM as a work area, in each processing of the image forming section, the image forming program stored in the ROM is read out and implemented various forms of processing equipped with the aforementioned functions according to the image forming program. To put it another way, the image forming program allows the image forming apparatus 1 to implement various forms of processing to be described later.

The following describes the image forming method as the first embodiment.

In the first place, the following describes the method for forming two or more types of dots having different densities per unit area for one hue: The method for forming two or more types of dots having different densities per unit area includes the method of changing the ink density for each dot, and the method for changing the diameter of each dot.

In one of the examples for the method of changing the ink density, inks of light color and dark colors are prepared in advance, and each of these inks is emitted from a different head. One and the same head is equipped with nozzles for emitting each type of ink. Further, liquid ink is used in some cases while a dark colored ink and transparent ink are used to get a light color, in other cases.

The dot diameter is changed, for example, when the cycle of driving the inkjet printer head is adjusted to change the dot diameter (ink particle size). To put it another way, if the drive cycle is short, the dot diameter is reduced. If the drive cycle is long, the dot diameter is increased in proportion to the length thereof. It is also possible to arrange such a configuration that one and the same head equipped with nozzles each for forming dots having different diameters, or a head equipped with nozzles, each for forming dots having a diameter different from that of the other nozzle, is arranged in advance.

In the present embodiment, the image processing is applicable to the inkjet printer having different heads for ejecting respectively two types of light colored ink and dark colored ink to form two types of low and high-density dots for each color, the light colored ink and the dark colored ink being prepared in advance.

Figure 2:
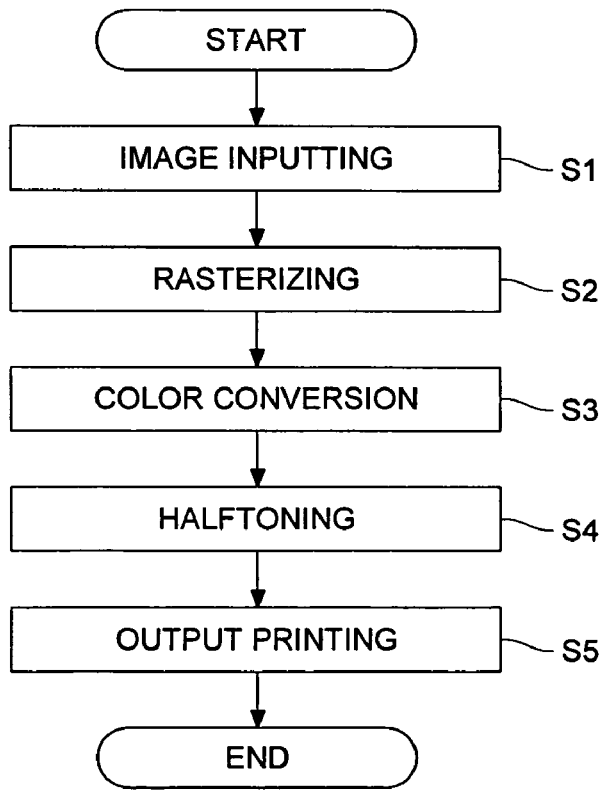
FIG. 2 is a flow chart showing the flow from the input of the original document image to the output of the output image.

Referring to the flowchart given in FIG. 2, the following describes the flow of operations ranging from inputting of an original image to outputting by a printer.

The image data composed of multi-gradation image data (pixel value of target pixel in the input image) is inputted into the RAM of the image forming apparatus 1 (Step S1), and the inputted image is converted from the vector data into the raster data (rasterization), as required (Step S2).

Then color conversion is carried out in conformity to the printer used for printing (Step S3). To put it more specifically, the color composed of red, green and blue (RGB) given on the display is converted into data of CMY(K)—cyan, magenta, yellow and (black)—in order to print it on reflective media.

Based on this data, halftone processing (details to be described later) is performed (Step S4). The type and arrangement of dots are determined by halftone processing. In the image subsequent to color conversion, processing is carried out for each pixel by forward scanning or zigzag scanning.

After halftone processing as described above, the output is printed by the printer (Step S5).

Figure 3:
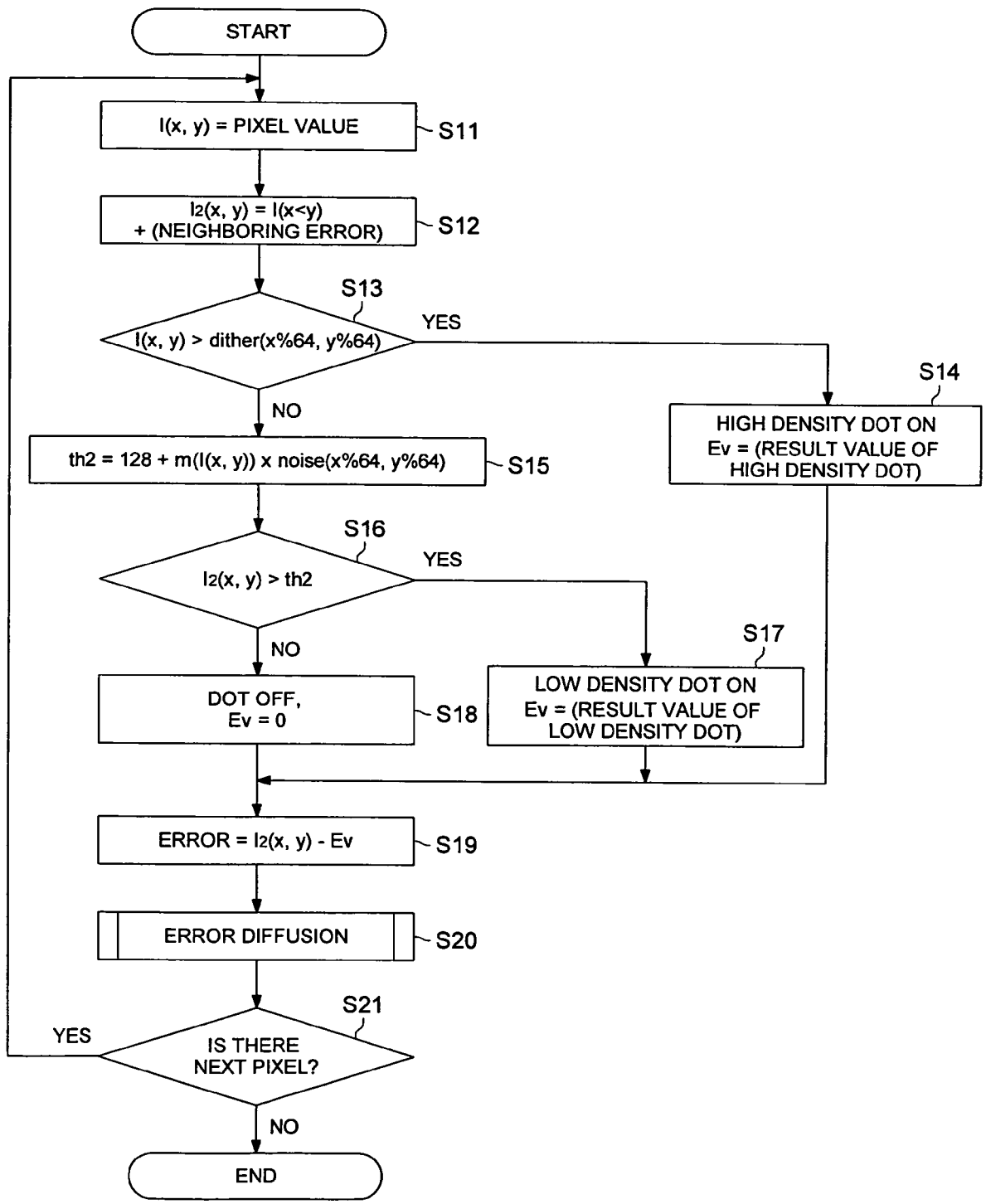
FIG. 3 is a flow chart showing the halftone processing in the first preferred embodiment.

Referring to the flowchart of FIG. 3, the following describes the halftone processing in Step S4:

FIG. 3 is a flowchart representing the halftone processing in an inkjet printer for forming two types of high-density dot and low-density dot for the ink of each color.

The first dot formation determining step is performed by the first dot formation determining section (the first dot formation determining function of the image forming program) 2. Dither processing is employed in the first dot formation determining step. Here the dither (x, y) denotes the threshold value matrix stored in advance. In the present embodiment, so-called a dot dispersion type threshold value matrix is used. Herein, x denotes the pixel position in the main scanning direction and y denotes the pixel position in the sub scanning direction. This matrix has a size of 64×64 pixels. The input image is composed of 8 bits (composed of 0 through 255 values), and a predetermined value to be described later is 150. Accordingly, the input pixel value and a predetermined value are added up, and the gradation value of 150 through 405 is included. It should be noted, however, that the threshold value matrix is not restricted thereto. In the present embodiment, arrangements are made in such a way as to calculate the remainder x % 64 obtained by dividing x by 64 and the remainder y % 64 obtained by dividing y by 64, with respect to the pixel position (x, y), whereby the value of the threshold value matrix "dither (x % 16, y % 16)" is utilized as threshold values to compare with pixel values.

Here, the threshold value matrix used in the present invention is described below.

Figure 4:
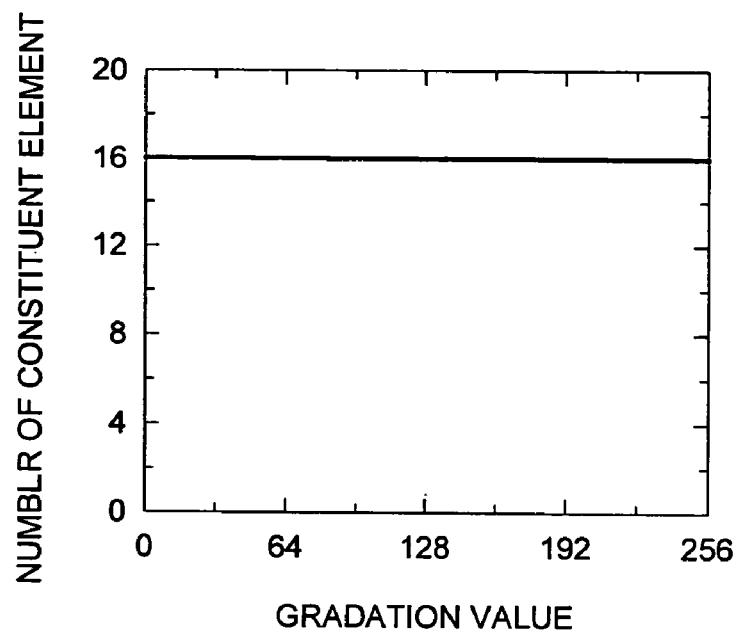
FIG. 4 is a graph showing the relationship between the threshold values in a conventional threshold value matrix and the number of constituent elements.

The conventionally used threshold matrix, as is shown in FIG. 4, is arranged so that there are equal numbers of all the threshold values. In more specific terms, in the threshold value matrix shown in FIG. 4, in a matrix with 64×64 pixels, the threshold values of 0 to 255 are placed so that there are (64×64)/256=16 of each threshold value in the matrix.

Figure 5:
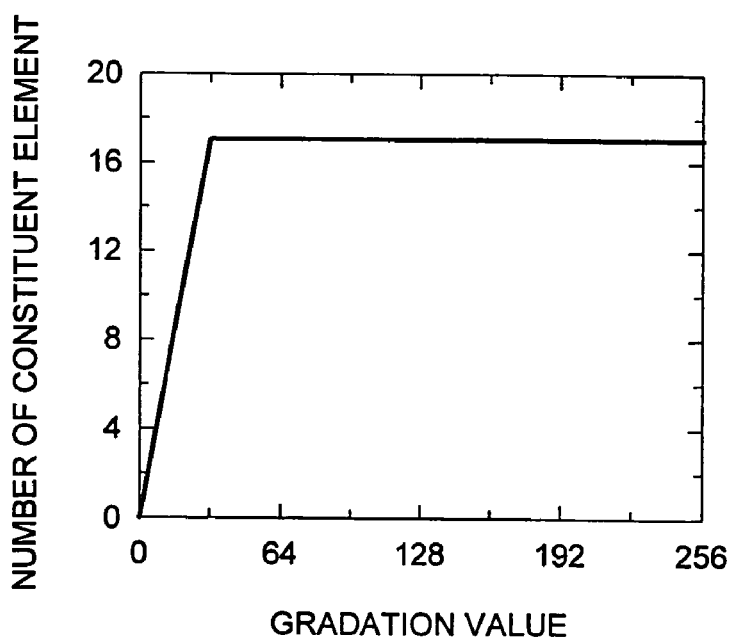
FIG. 5 is a graph showing the relationship between the threshold values in a threshold value matrix according to the present invention and the number of constituent elements.
Figure 6:
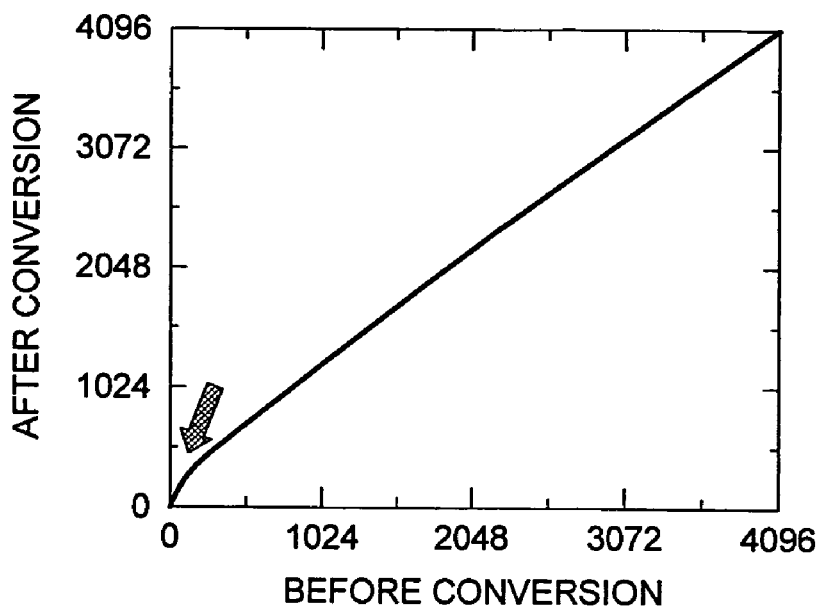
FIG. 6 is a graph showing the relationship before and after conversion of the distribution of the threshold value matrix according to the present invention.

In contrast with this, in the threshold value matrix according to the present invention, as is shown in FIG. 5, the arrangement is such that the relative number of threshold values in a range (a prescribed range) of threshold values from the smallest value up to a prescribed value is small.

Incidentally, in FIG. 5, gradation value of a horizontal axes is expresses as: gradation value=threshold value−predetermined value.

This prescribed range is desirably an area from the smallest threshold value to 5% or more, and it is still more desirable that this range is from the smallest threshold value to 10% or more. The results of experiments about the occurrence of pseudo-outlines within said prescribed range is shown in Table 1.

Further, in the present preferred embodiment, the number of threshold values allocated has been made small in the area of threshold values from the smallest to 10% (the highlight area or the location where there is a change between low and high-density dots), that is, the range of threshold values from 0 to 25.

Further, regarding the share of the number of other threshold values allocated, the prescribed range in which the share of the number of the threshold values allocated is made different is not restricted to said region of small threshold values, but can also be a region of large threshold values. (shadow area or the location where there is a change between low and high-density dots). Even in this area, it is preferable that the prescribed range is the area of threshold values from the largest to 5%, and it is still more preferable that this is the area from the largest threshold value to 10% or more.

The method of preparing said threshold value matrix in this preferred embodiment is described below.

To begin with, the numbers 0 to 4095 are allocated in a matrix of 64×64 pixels. This method of allocating threshold values is carried out using a well known technology such as dot fattening type, dot dispersion type, or blue noise mask, etc. Thereafter, as is shown by the graph in FIG. 6, the inclination of the starting point of the graph is increased by a prescribed amount (the part of the graph indicated by the arrow in the figure), and the distribution of the threshold value matrix is converted. However, since the input values in the present preferred embodiment are only 0 to 255 with an 8-bit resolution, the values from 0 to 4095 mentioned above are converted to matrix values of 1 for 0 to 15, 2 for 16 to 31, . . . , 255 for 4080 to 4095. After replacing with such threshold values, the distribution of the number of different elements within the matrix becomes like the graph shown in FIG. 5. In other words, although 16 of each of the elements described above are present in the conventional threshold value matrix, in the present preferred embodiment, as is shown in FIG. 5, the configuration is such that the number of elements in that part is smaller than 16 in the area of small threshold values.

In the present preferred embodiment, the value obtained by adding an offset value (prescribed value) of 150 to the value obtained after the conversion described above is taken as dither (x, y). This prescribed value 150 is selected for generating high-density dots at input gradation values of 150 or more.

Figure 7:
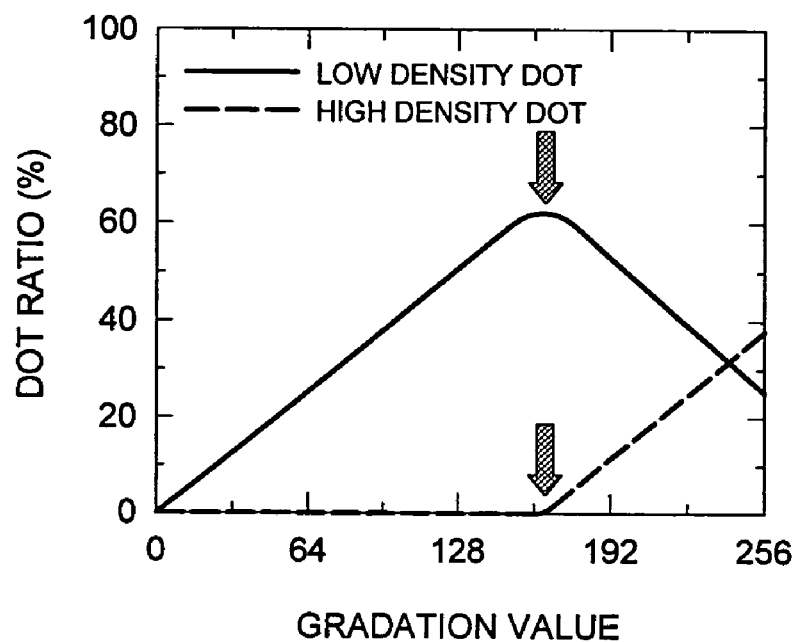
FIG. 7 is a graph showing the change in the dot rates of high-density and low-density dots when the halftone processing is done according to the first preferred embodiment.

When the processing shown in FIG. 3 is carried out using a threshold matrix set in this manner, the change in the dot rates of low and high-density dots obtained as a result of this is shown in FIG. 7. In the above manner, by having a threshold value distribution such as the one shown in FIG. 5, sudden increases in the dots at the entry point of dots are made gradual (the location indicated by the arrow in FIG. 7), and as a result, it is possible to eliminate discontinuities (the location

TABLE 1

| Range of making small the share of the number of gradation values (from the smallest gradation value) | 0% | 1% | 2% | 3% | 4% | 5% | 6% | 7% | 8% | 9% | 10% | 11% | 12% | 13% | 14% | 15% |
|---|---|---|---|---|---|---|---|---|---|---|---|---|---|---|---|---|
| Pseudo-outline | D | D | D | D | D | B | B | B | B | B | A | A | A | A | A | A |

Figure 8:
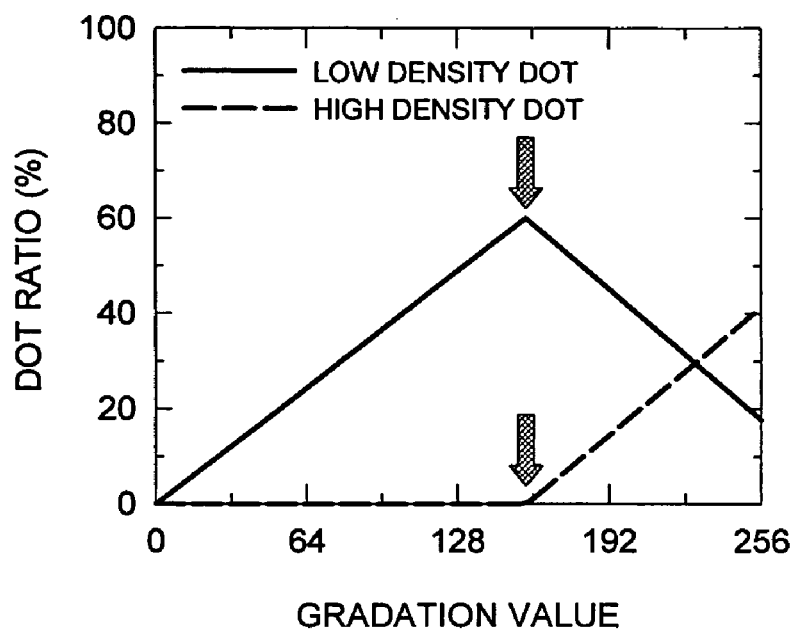
FIG. 8 is a graph showing the change in the dot rates of high-density and low-density dots when the halftone processing is done using a conventional threshold value matrix.

A: Absolutely no occurrence of pseudo-outlines.
B: Almost no occurrence of pseudo-outlines.
D: Pseudo-outlines occur.

indicated by the arrow) in the dot rate curve that used to occur conventionally as shown in FIG. 8.

In the flow chart of FIG. 3, the pixel value (input pixel value) in the predetermined target pixel is set to I (x, y) (Step S11). In this embodiment, since a zigzag scanning is performed where the scanning of reciprocating direction (both of forward and backward in the main scanning direction) is repeated, while the processing proceeds in the sub scanning direction, therefore, when y is odd number x increases, and when y is even number x decreases. Further, for the second dot formation determining section 3, the corrected pixel value is calculated by adding to the pixel value I (x, y) the neighboring error dispersed from the processed pixel by the error calculation section and error diffusion section, to be described later, to obtain the corrected pixel value $I_2(x, y)$ (Step S12).

Next, I (x, y) is compared with the value of threshold value matrix dither (x % 64, y % 64) stored in advance (Step S13). When the input image is composed of n bits of data, the aforementioned threshold value matrix is composed of values each of which is equal to or greater than a predetermined value greater than 0 and smaller than the maximum value $2^n$ taken by the pixel value of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein high-density dots appear, and hence to control the recorded ratio of the high density and low-density dots. If, as a result of this calculation, it has been determined that I (x, y) is greater than the value of the threshold value matrix dither (x % 64, y % 64), then the high-density dot is turned on, and the result value of the high-density dot (512 in this case) is substituted into the result value Rv (Step S14).

Conversely, when it has been determined that pixel value I (x, y) is not greater than the dither (x % 64, y % 64), the system goes to the second dot formation determining step implemented by the second dot formation determining section 54. This second dot formation determining step utilizes the processing of error diffusion.

In the first place, calculation is made to get the threshold value th2 used in the second dot formation determining step (Step S15). Herein, the first correction section provided in the second dot formation determining section 3 (a first correcting function in a second dot formation determining function of image forming program) conducts the first correcting process to correct the value of the threshold value matrix in the first dot formation determining process. And the second correction section provided in the second dot formation determining section 3 (a second correcting function in the second dot formation determining function of image forming program) conducts the second correcting process to add the value of the corrected threshold value matrix corrected in the first correcting process onto the threshold value (herein, 8 bit processing is performed, and the threshold value is 128) for determining dot formation by utilizing the error diffusion process.

To put it more specifically, firstly in the first calculating process, the threshold value matrix shifted (subtraction) by a certain value such that the average value becomes zero is stored as the noise(x, y) in advance. Further in the first calculating process, the term m (I(x, y)), which modulates the amplitude of threshold value matrix according to the pixel value of the target pixel, is multiplied to the value of this matrix noise(x % 64, y % 64), and the resultant value is added to the threshold value of error diffusion process 128 in the second correcting process.

$$th2 = 128 + m(I(x,y)) \times noise(x \% 64, y \% 64)$$

Figure 9:
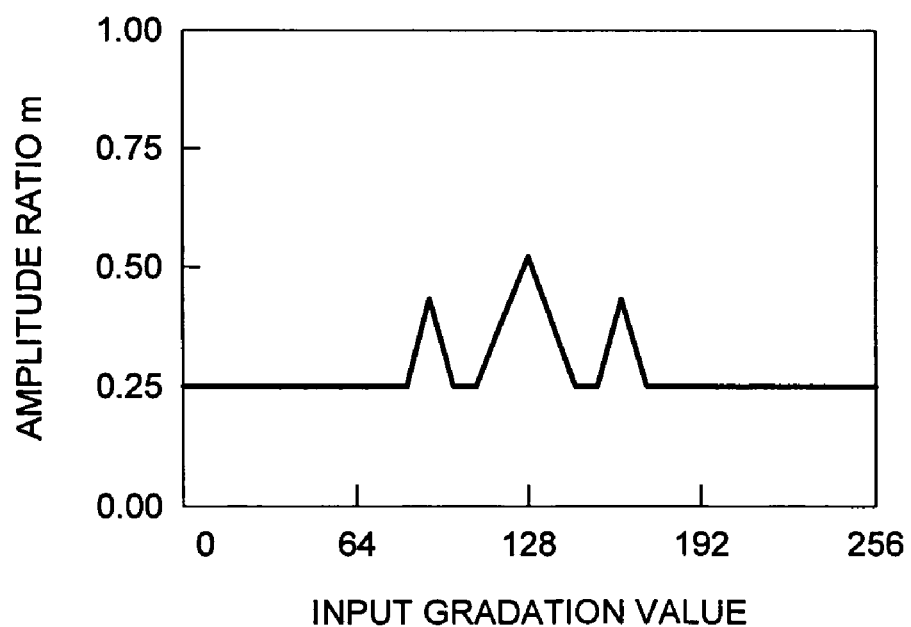
FIG. 9 is a graph showing an example of a table for determining the amplitude relative to the input gradation value according to the first preferred embodiment.

Herein, in the first correcting process, the amplitude of the threshold value matrix is varied based on the relation shown in FIG. 9. The term m(I(x, y) to modulate the amplitude of the threshold value matrix is multiplied in order to prevent generation of texture by increasing the amplitude ratio in the gradation value region where the texture specific to the error diffusion process is apt to appear (for example, as shown in FIG. 9, near the gradation value ½, ⅓, or ⅔ of the maximum value to be taken by the pixel value). Alternatively, the amplitude can be increased by the first correcting process, at the gradation value range where the high-density dot starts to appear.

The th2 calculated in the aforementioned manner is compared with $I_2$ (x, y) (Step S16). If the $I_2$ (x, y) is greater than th2, the low-density dot is turned on, and the result value (255 in this case) of the low-density dot is substituted into the Ev (Step S17). If the $I_2$ (x, y) is not greater than th2, the dot is turned off, and 0 is substituted into the Ev (Step S18).

After that, error calculation, $I_2$ (x, y)–Ev, is carried out by the error calculation section (Step S19) with using the result value Ev of S14, S18 and S18. Then a weight is assigned to the error for diffusion to unprocessed neighboring pixels (Step S20).

A decision step is taken to determine if there is the next pixel or not (Step S21). Upon processing of all pixels, halftone processing terminates. Lastly, the image forming apparatus 1 issues an instruction to all pixels to instruct which dots should be formed and which dots should not be formed. The image recording section records (outputs) the image.

It is also possible to make such arrangements that the predetermined value in the dither matrix is changed in response to the print resolution. This makes it possible to change the value wherein the dot used in the first dot formation determining section start to appear.

For example, when the print resolution is low, if the dots used by the first dot formation determining section as large dots or dark dots are not used frequently, many gaps will be produced on a recording medium, with the result that density will be insufficient. To prevent this, if the print resolution is low, the predetermined value is reduced so that the dots used in the first dot formation determining section will appear earlier.

It is also possible to arrange such a configuration that the predetermined value in the dither matrix is changed in response to the recording mode. This will make it possible to change the value wherein the dots used in the first dot formation determining section start to appear.

For example, in the high-quality image mode, the dots used by the second dot formation determining section as small dots or light dots must be frequently employed in order to decrease the graininess. Thus, in the high-quality image mode, the predetermined value is increased so that the dots used in the first dot formation determining section do not appear easily.

It is also possible to arrange such a configuration that the predetermined value in the threshold matrix is changed according to the type of the recording medium. This will make it possible to change the value wherein the dots used in the first dot formation determining section start to appear.

For example, plain paper has a lower ink absorbing capacity than special-purpose paper. When such a recording medium is used, the amount of ink must be reduced. In this case, the dots as dark dots used by the first dot formation determining section are mixed in the stage of a lower gradation value. This procedure provides the required density, despite a small amount of ink, thereby saving the overall amount of ink. Thus, when plain paper is used as a recording medium, the predetermined value is set to a small value so that the dots used by the first dot formation determining section will be produced earlier.

Embodiment 2

The following describes the image forming method as a second embodiment.

Figure 10:
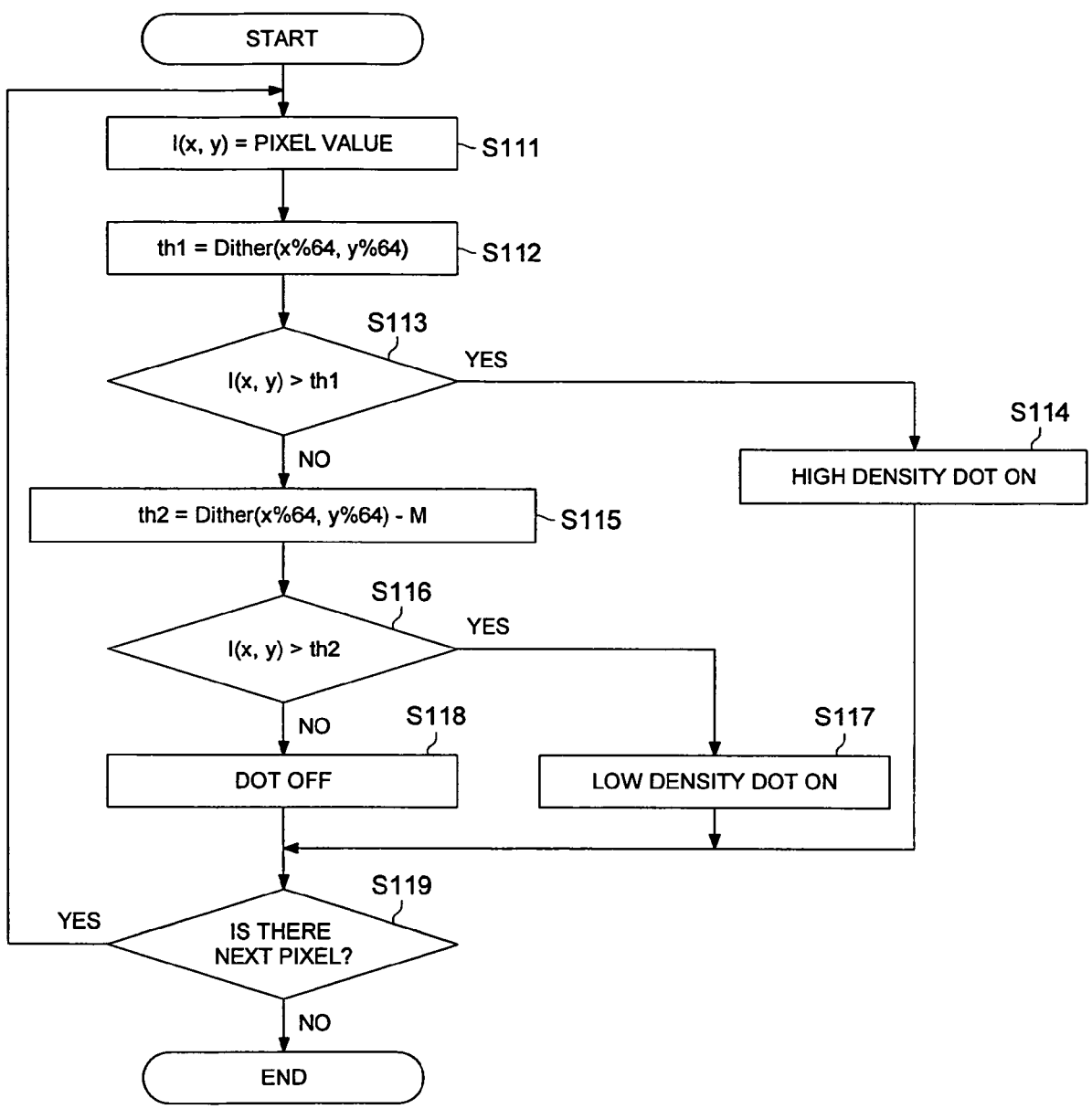
FIG. 10 is a flow chart showing the halftone processing in the second preferred embodiment.

The second embodiment is the same as the first embodiment except that the aforementioned halftone processing in Step S4 is applied in the manner shown in the flowchart of FIG. 10. The following will omit the description of the same processing and structure.

Referring to the flowchart of FIG. 10, the following describes the processing of halftone in the image forming method as the second embodiment.

In a description of this method, the same processing as that shown in the description of the first embodiment will be omitted.

The first dot formation determining step is performed by the first dot formation determining section (the first dot formation determining function of the image forming program) 2. Dither processing is employed in the first dot formation determining step.

The pixel value in the predetermined target pixel is assumed as I (x, y) (Step S111), and Dither (x % 64, y % 64) value of previously stored threshold value matrix Dither (x, y) is assumed as th1 (Step S112). In this threshold value matrix, the number of threshold values allocated has been made small in the area of threshold values from the smallest to 10%, that is, the range of threshold values from 0 to 25 in 8 bit data.

Next, I (x, y) is compared with th1 (Step S113). When the input image is composed of n bits of data, the aforementioned threshold value matrix is composed of values each of which is equal to or greater than a predetermined value greater than 0 and smaller than the maximum value $2^n$ taken by the pixel value of the input image. To put it another way, in the present embodiment, the input image is composed of 8 bits. Accordingly, the predetermined value is greater than 0 and smaller than 256. To put it more specifically, the predetermined value is 150. Thus, this predetermined value makes it possible to adjust the pixel value wherein high-density dots appear, and hence to control the recorded ratio of the high density and low-density dots. If, as a result of this calculation, it has been determined that I (x, y) is greater than the value of the threshold value th1, then the high-density dot is turned on (Step S114).

Conversely, when it has been determined that pixel value I (x, y) is not greater than th1, the system goes to the second dot formation determining step implemented by the second dot formation determining section (the second dot formation determining section in the image forming program) 3. This second dot formation determining step performs determination of dot formation by utilizing the processing of error diffusion.

In the first place, calculation is made to get the threshold value th2 used in the second dot formation determining step (Step S115). Herein, th2 is obtained by subtracting a predetermined value M (150, in this case) from the same dither value as utilized in S112. The obtained threshold value th2 is compared with I (x, y) (Step S116). When I (x, y) is greater than th2, the low-density dot is turned on (Step S117), and when I (x, y) is not greater than th2, the low-density dot is turned off (Step S118).

Then a decision step is taken to determine if there is the next pixel or not (Step S121). Upon processing of all pixels, halftone processing terminates. Lastly, the image forming apparatus 1 issues an instruction to all pixels to instruct which dots should be formed and which dots should not be formed. And the image recording section records (outputs) the image.

Figure 11:
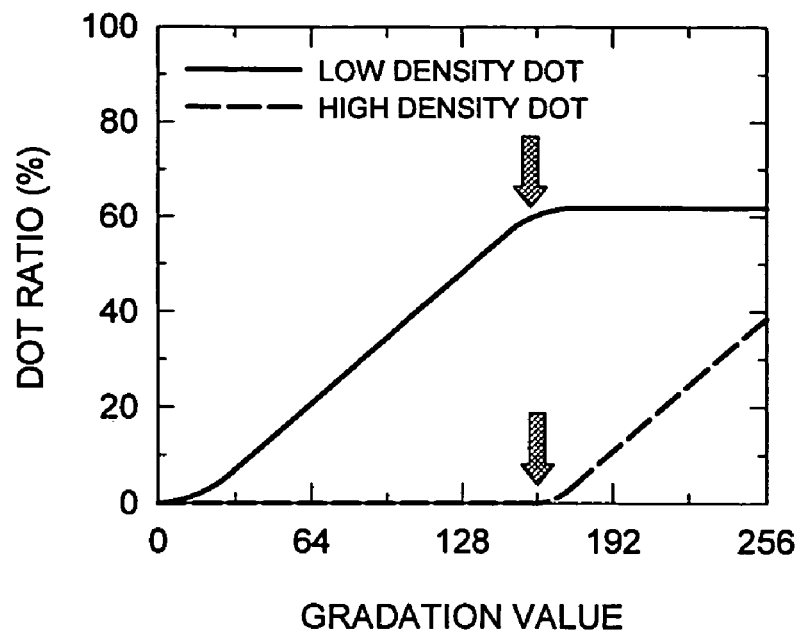
FIG. 11 is a graph showing the change in the dot rates of high-density and low-density dots when the halftone processing is done according to the second preferred embodiment.

When the processing shown in FIG. 10 is carried out using a threshold matrix according to the present invention in this manner, the change in the dot rates of low and high-density dots obtained as a result of this is shown in FIG. 11. In the above manner, by having a threshold value distribution such as the one shown in FIG. 11, sudden increases in the dots at the entry point of dots are made gradual (the location indicated by the arrow in FIG. 11), and as a result, it is possible to eliminate discontinuities in the dot rate curve that used to occur conventionally.

Next, a modified example of the second preferred embodiment is described below.

In dot rate control, when wanting to restrict the quantity of ink, etc., by narrowing the width of threshold value configuration, the inclination may sometimes be made large in the graph of threshold values of dense dots versus dot rate. If this is done, since more high-density dots are printed it is possible to suppress the amount of ink as compared to when more low-density dots are printed.

Figure 12:
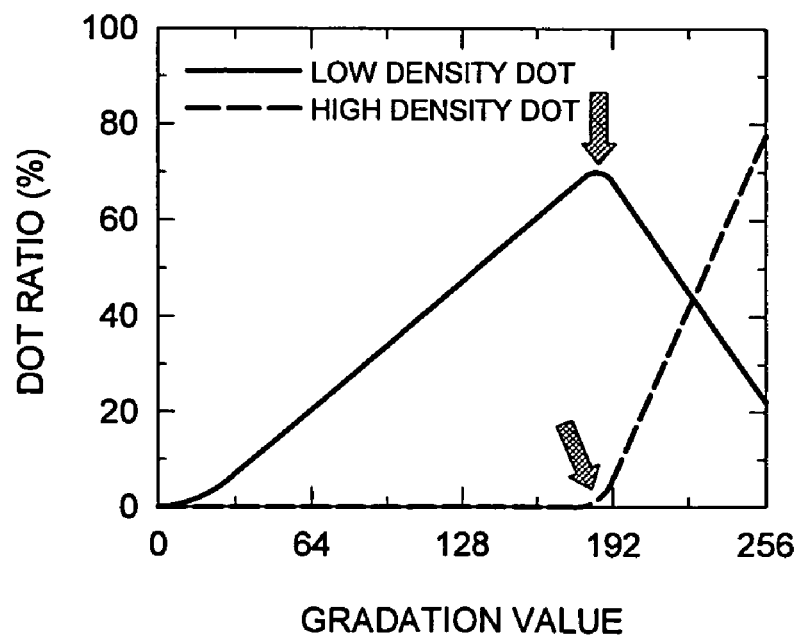
FIG. 12 is a graph showing the change in the dot rates of high-density and low-density dots when the halftone processing is done according to a modified example of the second preferred embodiment.

In this modified example, as is shown in FIG. 12, by making the inclination large in the graph of threshold values of dense dots versus the dot rate, the increase of dot rate of high-density dots is made earlier, and the amount of ink is restricted. In this case, although the pseudo-outlines were more pronounced than in the conventional method, by using the threshold matrix of this invention, sudden increases in the dots at the entry point of dots are made gradual (the location indicated by the arrow in FIG. 12), and as a result, it is possible to eliminate discontinuities in the dot rate curve that used to occur conventionally.

Embodiment 3

The following describes the image forming method as a third embodiment.

In this embodiment, a halftone processing to be used in an inkjet printer is described, the inkjet printer forming three types of dots, high-density dot, mid-density dot, and low-density dot for each color of ink. The following will omit the description of the same processing and structure as those of the first and the second embodiments.

Figure 13:
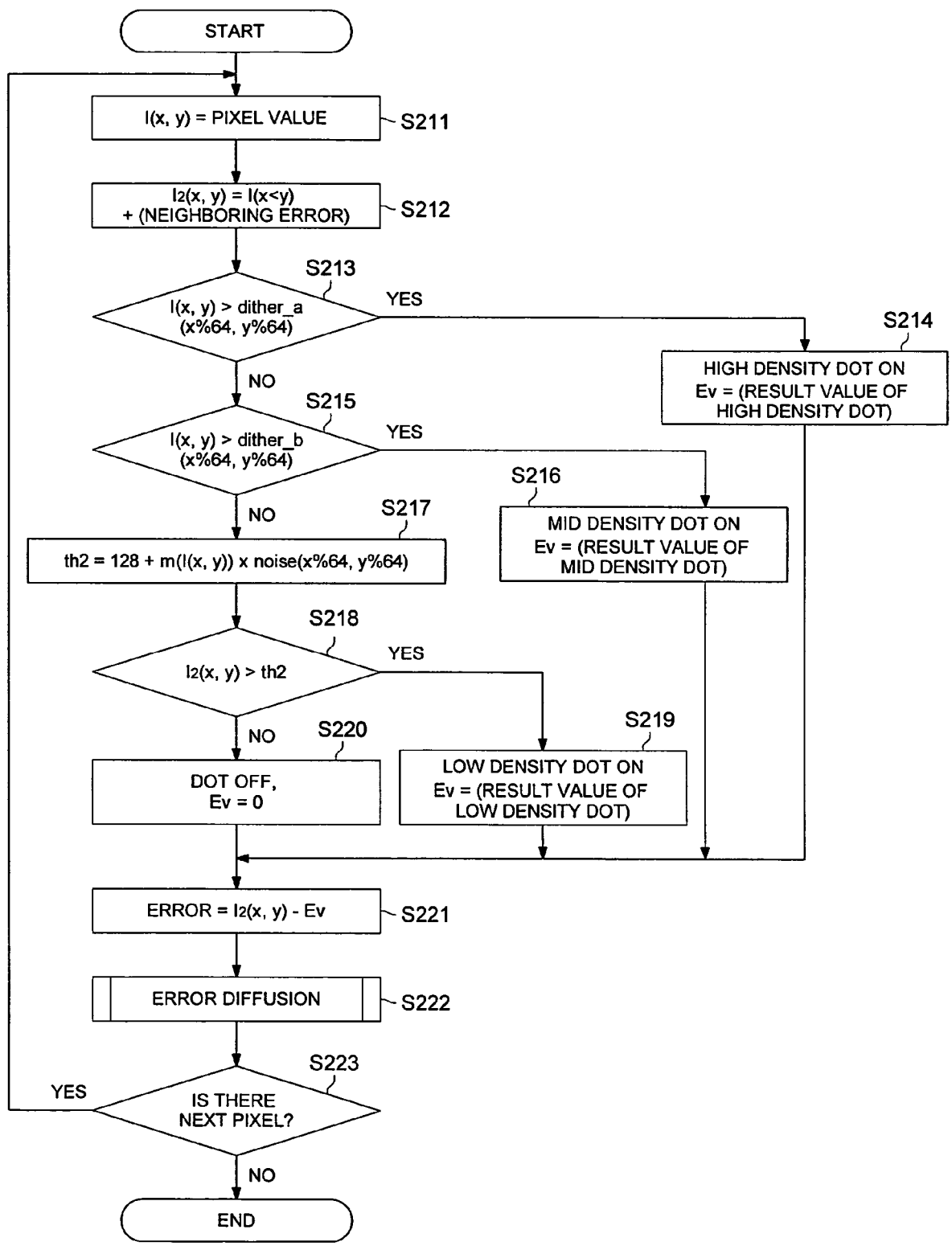
FIG. 13 is a flow chart showing the halftone processing in the third preferred embodiment.

Referring to the flowchart of FIG. 13, the following describes the halftone processing in the image forming method as the third embodiment.

Herein, the first dot formation determining section 2 (the first dot formation determining function in the image forming program) shown in FIG. 1 executes the first dot formation determining step. Dither processing is employed in this first dot formation determining step.

Here the dither_b(x, y) denotes the threshold value matrix stored in advance for the use of determining the mid-density dot formation. In the present embodiment, so-called a dot dispersion type threshold value matrix is used. Herein, xdenotes the pixel position in the main scanning direction and y denotes the pixel position in the sub scanning direction. This matrix has a size of 64×64 pixels. This dither_b(x,Y) is obtained by adding a prescribed value 90 to a standard dither matrix D(x,y). In this embodiment the input image is composed of 8 bits (composed of 0 through 255 values), accordingly the standard dither matrix D(x,y) is composed of threshold values 0-255, and the number of threshold values allocated has been made small in the area of threshold values from the smallest to 10%, that is, the range of threshold values from 0 to 25. It should be noted, however, that the threshold value matrix for determining the formation of mid-density dot is not restricted thereto. In the present embodiment, arrangements are made in such a way as to calculate the remainder x % 64 obtained by dividing x by 64 and the remainder y % 64 obtained by dividing y by 64, with respect to the pixel position (x, y), whereby the value of the threshold value matrix "dither (x % 16, y % 16)" is utilized as threshold values to compare with pixel values.

And, the dither_a(x, y) denotes the threshold value matrix stored in advance for the use of determining the high-density dot formation. Same as the dither_b(x, y), dither_a(x, y) is modified from the standard dither matrix D(x,y). To obtain the dither_a(x, y), the dither matrix D(x,y) is firstly multiplied by 0.35 and added with a prescribed value 160 corresponding to high density dots. In the present embodiment, arrangements are made in such a way as to calculate the remainder x % 64 obtained by dividing x by 64 and the remainder y % 64 obtained by dividing y by 64, with respect to the pixel position (x, y), whereby the value of the threshold value matrix "dither (x % 16, y % 16)" is utilized as threshold values to compare with pixel values.

From the above description for this embodiment, the following equation is satisfied:

"dither_$a(x, y)=0.35 \times D(x, y)+160$;

dither_$b(x, y)=D(x, y)+90$

Further, by doing in this manner, it is possible to control so that mid-density dots occur at input gradation values of 90 or more and high-density dots at 160 or more. In addition, since dither_b(x, y) is in a same magnification with D(x, y), the increasing rate of dither_b(x, y) is same as that of D(x, y). In contrast, since dither_a(x, y) comprises D(x, y) multiplied by 0.35, it is possible to make the increasing rate of dots generated by dither_a(x, y) relative to D(x, y) become 2.85.

The descriptions of other detailed definitions and settings are omitted here, since they are the same as in the first preferred embodiment described above. Further, in the present preferred embodiment, two dot formation determining sections are provided, namely, for high-density dot formation judgment and mid-density dot formation judgment.

Here, firstly, the pixel value (input pixel value) at a prescribed target pixel is I(x, y) (Step S211).

Further, for the second dot formation determining section 3, the corrected pixel value $I_2(x, y)$ is calculated by adding to said pixel value I(x, y) the peripheral error (cumulative value quantization error) diffused from the pixels already processed using the error calculation section and the error diffusion section to be described later (Step S212).

Next, I (x, y) is compared with the dither_a(x % 64, y % 64) which is the value of threshold value matrix stored in advance (Step S213). If, as a result of this comparison, it has been determined that I (x, y) is greater than the value of threshold value matrix dither_a (x % 64, y % 64), then the high-density dot is turned on and the result value of high-density dot (512 in this case) is substituted to the result value Ev (Step S214).

Conversely, when it has been determined that pixel value I (x, y) is not greater than dither (x % 64, y % 64), I (x, y) is compared with the dither_b(x % 64, y % 64) which is the value of threshold value matrix stored in advance (Step S215). If, as a result of this calculation, it has been determined that I (x, y) is greater than the value of threshold value matrix dither_b (x % 64, y % 64), then the mid-density dot is turned on and the result value of mid-density dot (382 in this case) is substituted to the result value Ev (Step S216).

Conversely, when it has been determined that pixel value I (x, y) is not greater than dither_b(x % 64, y % 64), the system goes to the second dot formation determining step implemented by the second dot formation determining section (second dot formation determining function of the image forming program) 3 shown in FIG. 1. This second dot formation determining step utilizes error diffusion processing to perform the dot formation determination.

Firstly, the threshold value th2 is calculated to be used in the second dot formation determining step (Step S217). Herein, the first correcting section (the first correcting function in the second dot formation determining function of the image forming program) conducts the first correcting step to correct the value of threshold value matrix of the first dot formation determining step. And, the second correcting section provided in the second dot formation determining section 3 (the second correcting function in the second dot formation determining function of the image forming program) conducts the second calculating step to add the value of the threshold value matrix corrected in the first calculating step onto the threshold value (the threshold value is 128 since 8 bit processing is applied in this case) to determine whether to form the dot in the error diffusion process.

To be more specific, firstly, the threshold value matrix, which is shifted (subtracted) by a certain value in the first correcting step such that the average value of threshold value matrix dither_b(x, y) becomes zero, is stored as the noise(x, y). Further in the first calculating step, the value of matrix noise(x, y) is multiplied by the term m(I(x, y)) to modulate the amplitude of the threshold value matrix in accordance with the pixel value of the target pixel. And the obtained value is added to the threshold value 128 of the error diffusion processing in the second correcting step.

The obtained threshold value th2 is compared with $I_2(x, Y)$ (Step S218). When $I_2$ (x, y) is greater than th2, the low-density dot is turned on and the result value of low-density dot (255 in this case) is substituted to the result value Ev(Step S219). When $I_2$ (x, y) is not greater than th2, the low-density dot is turned off and 0 is substituted to the result value Ev (Step S220).

After that, the error calculating section calculates the error $I_2$ (x, y)–Ev by using the result value Ev of S214, S216, S219 or S220 (Step S221). Then the error diffusion section assigns a prescribed weight to the error and diffuses to the unprocessed neighboring pixels (Step S222).

Then a decision step is taken to determine if there is the next pixel or not (Step S223). Upon processing of all pixels, halftone processing terminates. Lastly, the image forming apparatus 1 issues an instruction to all pixels to instruct which dots should be formed and which dots should not be formed. The image recording section records (outputs) the image.

Figure 14:
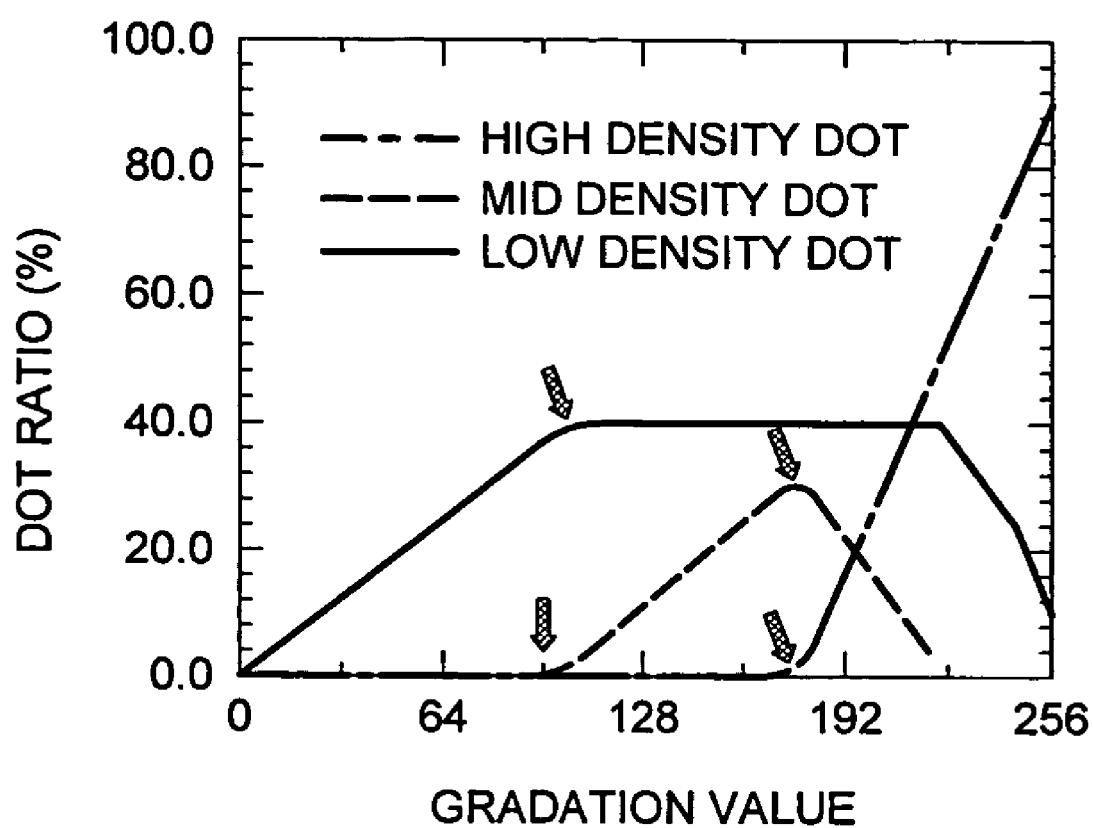
FIG. 14 is a graph showing the change in the dot rates of high-density, mid-density and low-density dots when the halftone processing is done according to the third preferred embodiment.

When the processing shown in FIG. 13 is carried out using a threshold matrix according to the present invention in this manner, the change in the dot rates of high, mid, and low-density dots obtained as a result of this is shown in FIG. 14. In the present preferred embodiment, the sum of the dot rate of low-density dots (number of elements), the dot rate of medium dots, and the dot rate of high-density dots becomes the dot rate of all dots. In the above manner, by having a threshold value distribution such as the one shown in FIG. 14, sudden increases in the dots at the entry point of dots are made gradual (the location indicated by the arrow in FIG. 14), and as a result, it is possible to eliminate discontinuities in the dot rate curve that used to occur conventionally.

Incidentally, three types of dots: high-density dot, mid-density dot, and low-density dot are formed in the third embodiment, however, dot types should not be restricted to these. For example, the combinations of large, mid, small sized dots and dark, mid dark, light dots can be utilized, and further, 4 or more types of dots such as dark, light, large, and small dots can be formed.

Embodiment 4

The following describes the image forming method as a fourth embodiment.

In this embodiment, a halftone processing to be used in an inkjet printer is described, the inkjet printer forming three types of dots, high-density dot, mid-density dot, and low-density dot for each color of ink. The following will omit the description of the same processing and structure as those of the first to third embodiments.

Figure 15:
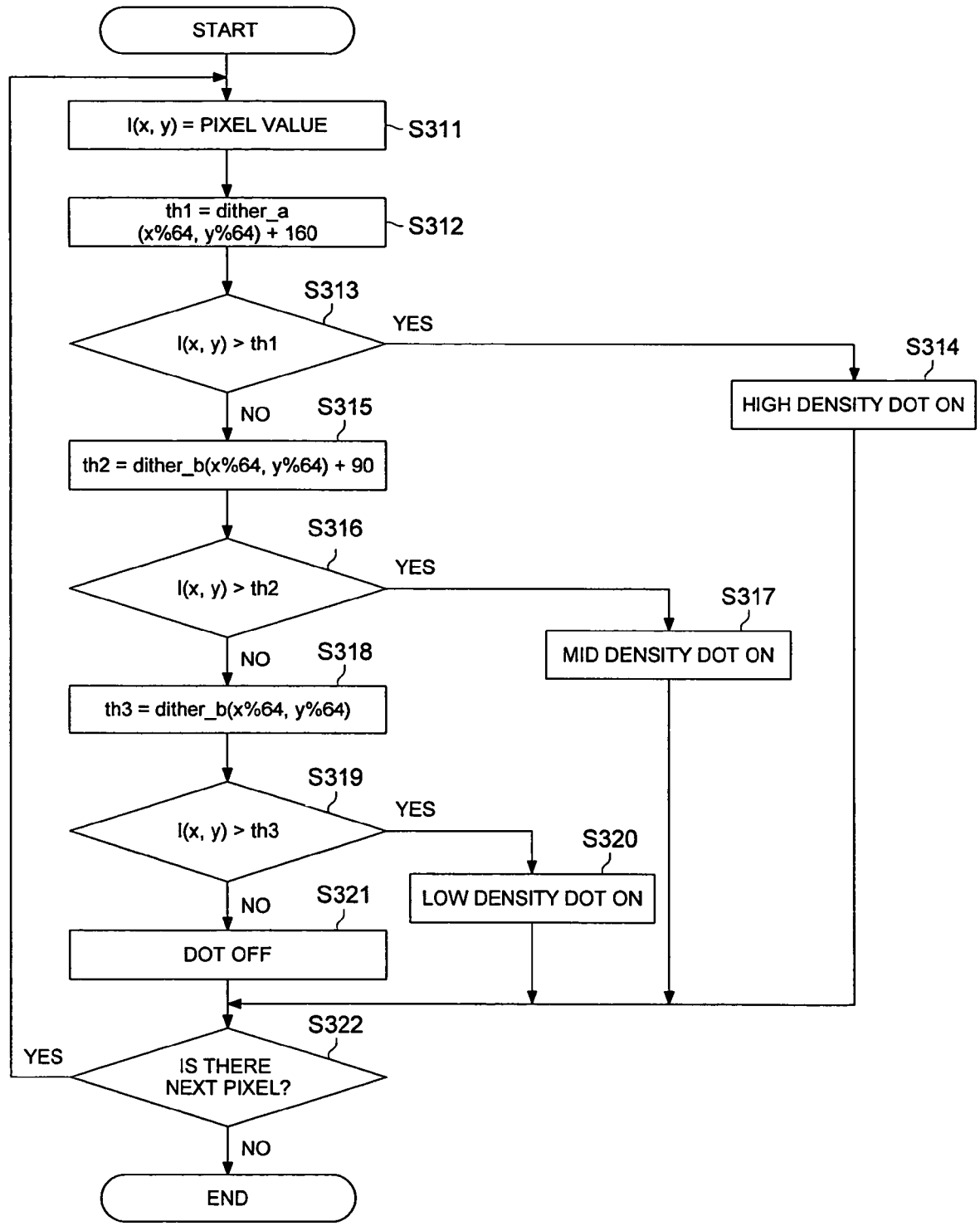
FIG. 15 is a flow chart showing the halftone processing in the fourth preferred embodiment.

Referring to the flowchart of FIG. 15, the following describes the halftone processing in the image forming method as the fourth embodiment.

Herein, the first dot formation determining section 2 shown in FIG. 1 (the first dot formation determining function of the image forming program) executes the first dot formation determining step. Dither processing is employed in this first dot formation determining step.

Here, th3=dither_b(x, y) denotes the threshold value matrix stored in advance for the use of determining the low-density dot formation. In the present embodiment, so-called a dot dispersion type threshold value matrix is used. Herein, x denotes the pixel position in the main scanning direction and y denotes the pixel position in the sub scanning direction. This matrix has a size of 64×64 pixels. The input image is composed of 8 bits (composed of 0 through 255 values), and the gradation value of 0 through 255 is included. In this threshold value matrix, the number of threshold values allocated has been made small in the area of threshold values from the smallest to 10%, that is, the range of threshold values from 0 to 25 in 8 bit data. It should be noted, however, that the threshold value matrix for determining the formation of low-density dot is not restricted thereto. In the present embodiment, arrangements are made in such a way as to calculate the remainder x % 64 obtained by dividing x by 64 and the remainder y % 64 obtained by dividing y by 64, with respect to the pixel position (x, y), whereby the value of the threshold value matrix "dither (x % 16, y % 16)" is utilized as threshold values to compare with pixel values.

And, th2 =dither_b(x, y)+90 denotes the threshold value matrix stored in advance for the use of determining the mid-density dot formation. Since the predetermined value is 90, th2 includes threshold values from 90 to 345 (added 90 to input pixel values). Except for adding 90, th2 is same as th3. In this threshold value matrix, the number of threshold values allocated has been made small in the area of threshold values from the smallest to 10%, that is, the range of threshold values from 90 to 115 in 8 bit data. It should be noted, however, that the threshold value matrix for determining the formation of mid-density dot is not restricted thereto. In the present embodiment, arrangements are made in such a way as to calculate the remainder obtained by dividing x by 64 and the remainder obtained by dividing y by 64, with respect to the pixel position (x, y), whereby the value of the threshold value matrix "dither_b(x % 16, y % 16)+90" is obtained.

And, th1 =dither_a(x, y)+160 denotes the threshold value matrix stored in advance for the use of determining the high-density dot formation. Same as the dither_b(x, y), a dot dispersion type threshold value matrix is used. This matrix also has a size of 64×64 pixels. To obtain the dither_a(x, y), dither_b(x, y) is firstly multiplied by 0.35. The input image is composed of 8 bits (composed of 0 through 255 values), and a value of 160 (obtained by adding a predetermined value 70 to the predetermined value 90 of dither_b(x, y))is added. Then the dither_a(x, y) includes threshold values of 160-415. It should be noted, however, that the threshold value matrix for determining the formation of mid-density dot is not restricted thereto. In the present embodiment, arrangements are made in such a way as to calculate the remainder obtained by dividing x by 64 and the remainder obtained by dividing y by 64, with respect to the pixel position (x, y), whereby the value of the threshold value matrix "dither_a(x % 16, y % 16)+160" is obtained.

From the above description for this embodiment, the following equation is satisfied:

"th1=dither_a(x % 64, y % 64)+160=0.35×dither_b(x % 64, y % 64)+160; th2=dither_b(x % 64, y % 64)+90=th3+90; th3=dither_b(x % 64, y % 64)"

Further, by doing in this manner, same as the third embodiment it is possible to control so that mid-density dots occur at input gradation values of 90 or more and high-density dots at 160 or more. In addition, since dither_a(x, y) is dither_b(x, y) multiplied by 0.35, it is possible to make the rate of increase of dots generated by dither_a(x, y) relative to dither_b(x, y) become 2.85.

The descriptions of other detailed definitions and settings are omitted here, since they are the same as in the first preferred embodiment described above. Further, in the present preferred embodiment, two dot formation determining sections are provided, namely, for high-density dot formation judgment and mid-density dot formation judgment.

Incidentally, in the present embodiment, the threshold matrixes th1, th2, th3 are calculated for each pixel, however, this is not necessary. For example, by calculating the values of th1, th2, and th3, and storing these values in advance, and at the time of processing each pixel, the value can be read out. Doing this way is preferable as effective processing can be performed.

Here, firstly, the pixel value (input pixel value) at a prescribed target pixel is I(x, y) (Step S311).

Further, as has been described above, the value dither_a(x % 64, y % 64)+160 of the threshold matrix saved beforehand is taken as th1 (Step S312). This threshold value matrix, similar to the first preferred embodiment, is configured so that the number of threshold values allocated is made small in the area from the smallest threshold value up to 10%, that is, in the range of threshold values from 160 to 185 with 8-bit data.

Next, I(x, y) is compared with said value th1 of the threshold value matrix (Step S313). As a result of this comparison, if I(x, y) is judged to be larger than the value th1 of the threshold value matrix, the high-density dot is made ON (Step S314).

On the other hand, if I(x, y) is judged to be not larger than the value th1 of the threshold value matrix, as has been explained above, the threshold value matrix stored beforehand dither_b(x % 64, y % 64)+90 is taken as th2 (Step S315). This threshold value matrix, similar to the first preferred embodiment, is configured so that the number of threshold values allocated is made small in the area from the smallest threshold value up to 10%, that is, in the range of threshold values from 90 to 115 with 8-bit data.

Next, I(x, y) is compared with the value th2 of the threshold value matrix that has been stored beforehand (Step S316). As a result of this computation, if I(x, y) is judged to be larger than the value th2 of the threshold value matrix, the medium dot is made ON (Step S317).

On the other hand, if I(x, y) is judged to be not larger than the value th2 of the threshold value matrix, as has been explained above, the threshold value matrix stored beforehand dither_b(x % 64, y % 64) is taken as th3 (Step S318). This threshold value matrix, similar to the first preferred embodiment, is configured so that the number of threshold values allocated is made small in the area from the smallest threshold value up to 10%, that is, in the range of threshold values from 0 to 25 with 8-bit data.

Next, I(x, y) is compared with the value th3 of the threshold value matrix that has been stored beforehand (Step S319). As a result of this computation, if I(x, y) is judged to be larger than the value th3 of the threshold value matrix, the low-density dot is made ON (Step S320).

In contrast with this, if the pixel value I(x, y) is judged to be not smaller than th3, that dot is not printed (the dot is made OFF) (Step S321).

Thereafter, a judgment is made as to whether or not a next pixel is present (Step S322), and the halftone processing is ended after carrying out the processing of all the pixels. At the end, the image forming apparatus 1 gives the instruction for all dots as to which dot is to be formed and which dot is not be formed, and the image recording section writes (outputs) the image.

Figure 16:
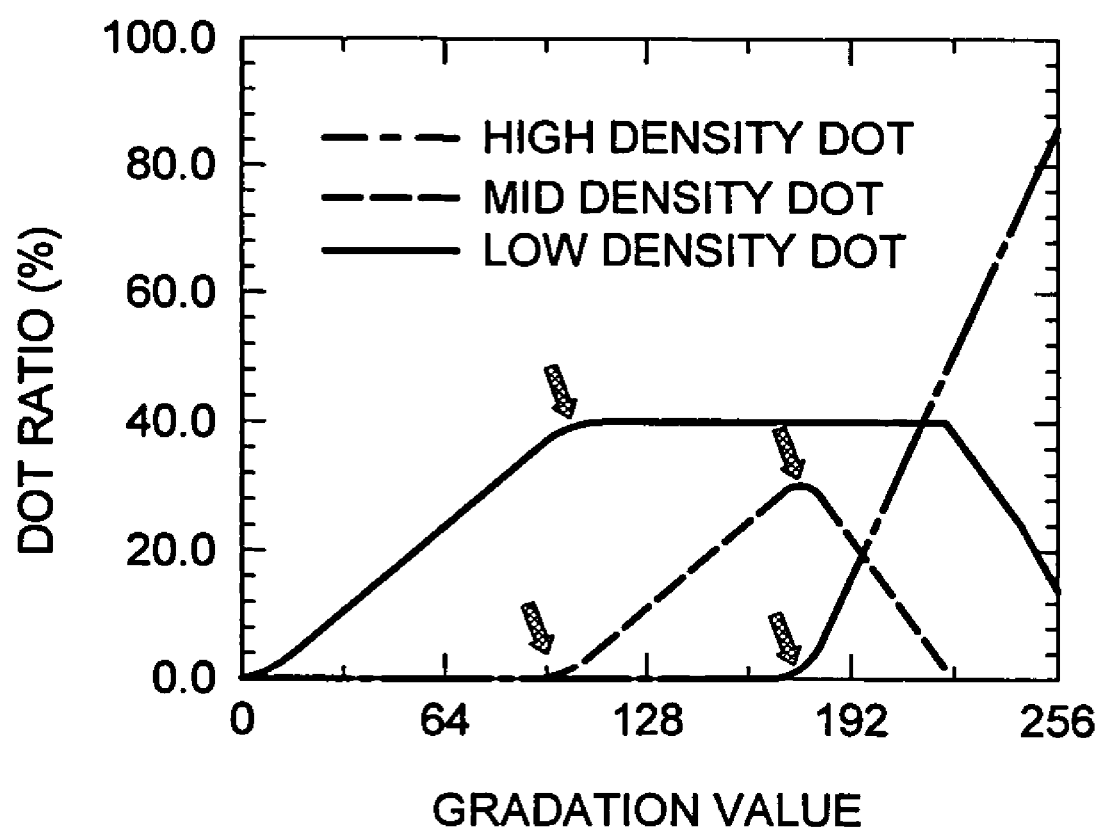
FIG. 16 is a graph showing the change in the dot rates of high-density, mid-density and low-density dots when the halftone processing is done according to the fourth preferred embodiment.

In this manner, when the processing of FIG. 15 is carried out using a threshold value matrix according to the present invention, the changes in the dot rates of high-density and low-density dots obtained as a result of this processing are shown in FIG. 16. In the present preferred embodiment, the sum of the dot rate of low-density dots (number of elements), the dot rate of mid-density dots, and the dot rate of high-density dots becomes the dot rate of all dots. In the above manner, by having a threshold value distribution such as the one shown in FIG. 16, sudden increases in the dots at the entry point of dots are made gradual (the location indicated by the arrow in FIG. 16), and as a result, it is possible to eliminate discontinuities in the dot rate curve that used to occur conventionally.

Further, although three types of dots, namely, high, mid, and low-density dots are being formed in the fourth preferred embodiment, it is not necessary to restrict to this, but, similar to the third preferred embodiment, it is also possible to form combinations of small, medium, and large sized dots or dark, light, and small dots, etc., and also it is possible to for four or more types of dots such as dark, light, large, and small dots.

Fifth Embodiment

Next, the image forming method in a fifth preferred embodiment is described below.

In the present preferred embodiment, the halftone processing is indicated in the case of an ink jet printer in which two types of dots of high and low densities are formed for the inks of each color. Further, the explanations will be omitted here for the processing and configuration that are similar to said first preferred embodiment to fourth preferred embodiment.

The halftone processing in an image forming method according to the fifth preferred embodiment is described in the following referring to the flow chart of FIG. 17.

In the present preferred embodiment, the dot formation determining step carried out by said dot formation determining section (the dot formation determining function of the image forming program) is provided with a selection step, carried out by a selection section (not shown in FIG. 1, selection function of the image forming program), of selecting the first dot formation determining step carried out by the first dot formation determining section 2 (the first dot formation determining function of the image forming program) if said pixel value is above a prescribed value and selecting the second dot formation determining step carried out by the second dot formation determining section 3 (the second dot formation determining function of the image forming program) if said pixel value is below a prescribed value, wherein said first dot formation determining section 2 is one that carries out a determining as to whether to form the first dot or to form the second dot by comparing said pixel value with the threshold value at the, corresponding position in said threshold value matrix, and said second dot formation determining section 3 carries out a determining as to whether or not to form said second dot.

The descriptions of other detailed definitions and settings are omitted here, since they are the same as in the first preferred embodiment described above.

Here, firstly, the pixel value (input pixel value) at a prescribed target pixel is I(x, y) (Step S411).

Next, in the selection section, a determining is made as to whether or not the pixel value I(x, y) is larger than 128 (Step S412). Here, if the pixel value I(x, y) is judged to be larger than 128, the pixel value I(x, y) is taken as I(x, y)−128 (Step S413), and a 1 is substituted in the result value 'Result' (Step S414).

On the other hand, if the pixel value I(x, y) is judged to be not larger than 128, a 0 is substituted in the result value 'Result' (Step S415).

Figure 18:
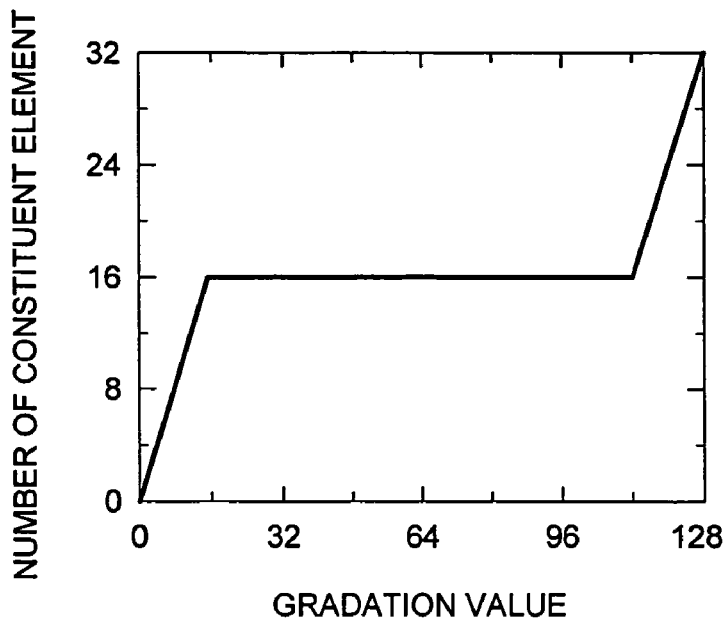
FIG. 18 is a graph showing the relationship between the threshold values in a conventional threshold value matrix and the number of constituent elements according to the fifth preferred embodiment.

After the steps S414 and S415, I(x, y) is compared with the value th(x % 64, y % 64) of the threshold value matrix that has been stored beforehand (Step S416). This threshold value matrix, as is shown in FIG. 18, is configured so that the number of threshold values allocated in a prescribed area of threshold values from the smallest value is small, and also, the number of threshold values allocated in a prescribed area of threshold values from the largest value is large. As a result of this computation, if I(x, y) is judged to be larger than the value th(x % 64, y % 64) of the threshold value matrix, the result value 'Result' is incremented by +1 (Step S417).

In contrast with this, if I(x, y) is judged to be not larger than the value th(x % 64, y % 64) of the threshold value matrix, the result value 'Result' is left as it is (Step S418).

Next, depending on said result value 'Result', a judgment is made (Step S419) as to whether to make a high-density dot ON (Step S420), or to make a low-density dot ON (Step S421), or not to print a dot (making the dot OFF) (Step S422).

Thereafter, a judgment is made as to whether or not a next pixel is present (Step S423), and the halftone processing is ended after carrying out the processing of all the pixels. At the end, the image forming apparatus 1 gives the instruction for all dots as to which dot is to be formed and which dot is not be formed, and the image recording section writes (outputs) the image.

Figure 17:
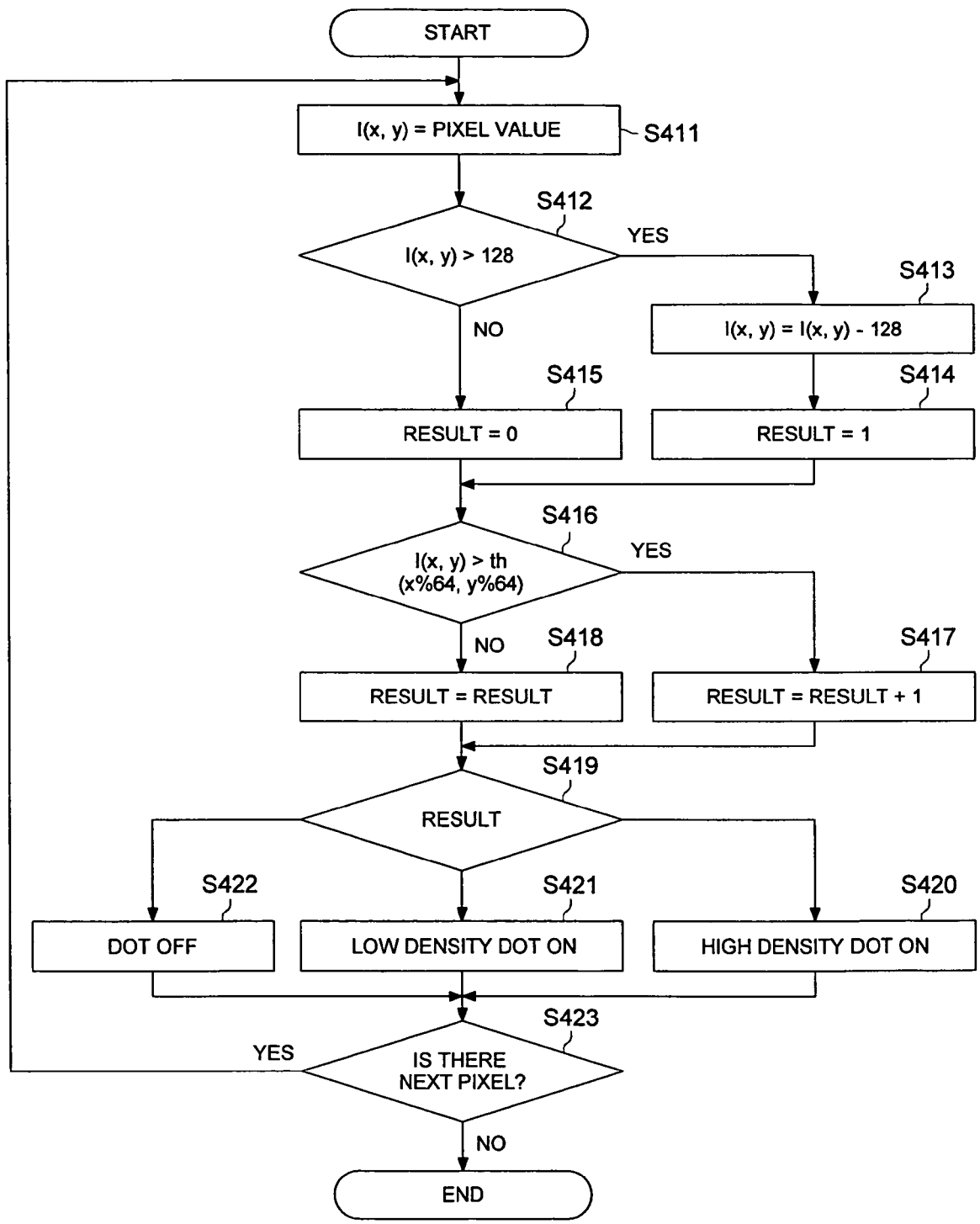
FIG. 17 is a flow chart showing the halftone processing in the fifth preferred embodiment.
Figure 19:
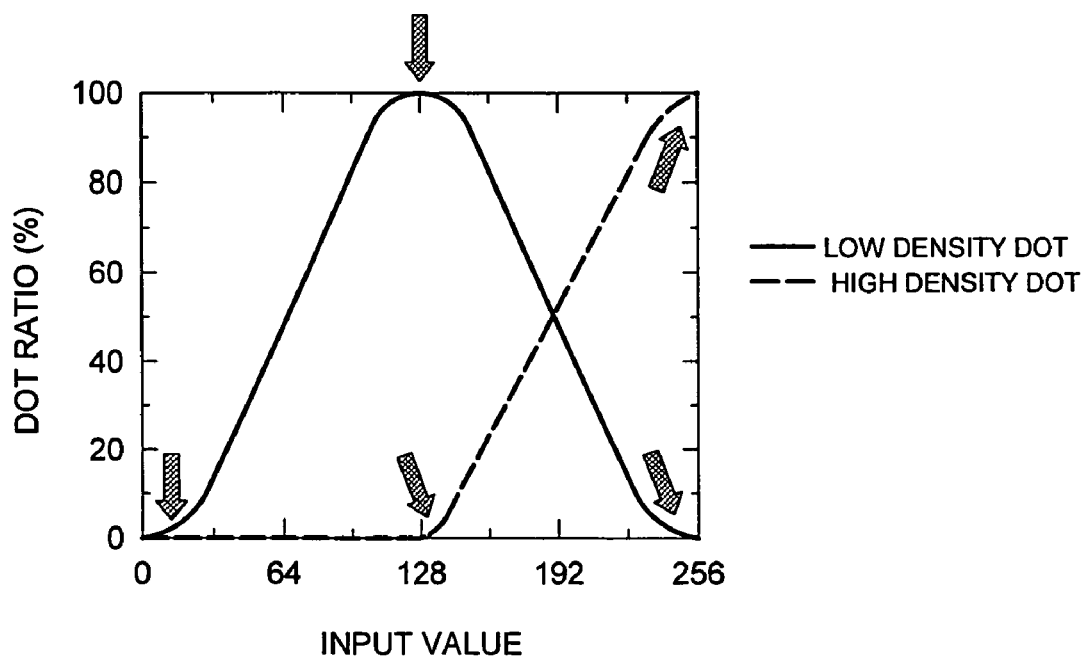
FIG. 19 is a graph showing the change in the dot rates of high-density and low-density dots when the halftone processing is done according to the fifth preferred embodiment.

In this manner, when the processing of FIG. 17 is carried out using a threshold value matrix according to the present invention, the changes in the dot rates of high-density and low-density dots obtained as a result of this processing are shown in FIG. 19. In the above manner, by having a threshold value distribution such as the one shown in FIG. 19, sudden increases in the dots at the entry point of dots are made gradual (the location indicated by the arrow in FIG. 19), and as a result, it is possible to eliminate discontinuities in the dot rate curve that used to occur conventionally. In addition, in the present preferred embodiment, sudden decreases in the dots at the end of printing dots are made gradual (the location indicated by the arrow in FIG. 19), and even as a result of this, it is possible to eliminate discontinuities in the dot rate curve that used to occur conventionally.

In the above manner, according to the image forming apparatuses of each of the above preferred embodiments, because the image forming apparatus that forms images using distributions of two or more types of dots with different densities per unit area within the same hue is provided with a threshold value matrix having a size of a prescribed region smaller than the input image, a dot formation determining section that compares the pixel value at the target pixel in the input image and the threshold value at the corresponding position in said threshold value matrix, and based on the result of that comparison, judges whether to form or not to form any one of the dots among two or more types of dots with different densities per unit area at a position corresponding to said target pixel, and since the threshold values in said threshold value matrix are configured so that the frequency of occurrence of dots is lower for the gradation regions in which the density of any of said two or more types of dots with different densities is rare and/or dense is lower than the frequency of occurrence in the gradation regions in which the dot density is average, by making the frequency of occurrence of dots at positions at which dots occur that are likely to cause the occurrence of pseudo-outlines smaller than the frequency of occurrence in other regions, it is possible to make gradual the change in the dot rate density of that dot and to suppress pseudo-outlines.

In other words, said threshold matrix is configured so that the share of the number of threshold values allocated in a prescribed range is made different from the share of the number of other threshold values allocated, it is possible to change the inclination of the rate of increase of dots generated due to the threshold value matrix.

Further, in the first preferred embodiment to the fourth preferred embodiment, since said dot formation determining section is provided with a first dot formation determining section that compares said pixel value and the threshold value at a corresponding position in threshold value matrix and judges whether or not to form the first dot, and a second dot formation determining section that judges whether or not to form said second dot at the position at which it was judged not to form said first dot, the second dot is related to the increase in the dot rate of the first dot. Therefore, by adjusting the frequency of occurrence of dots in a gradation area in which the dot density of the first dot is rare, not only the change in the density of the first dot becomes gradual, but also the change in the density of the second dot becomes gradual, and becomes possible to suppress pseudo-outlines at locations where the dots change.

In addition, in the fifth preferred embodiment, since said dot formation determining section is provided with a selection section that selects the first dot formation determining section if said pixel value is larger than a prescribed value and selects the second dot formation determining section if said pixel value is less than or equal to the prescribed values and since said first dot formation determining section is one that compares said pixel value and the threshold value at a corresponding position in threshold value matrix and judges whether to form the first dot or to form the second dot, and since said second dot formation determining section is one that judges whether or not to form said second dot, the second dot is related to the increase in the dot rate of the first dot. Therefore, by adjusting the frequency of occurrence of dots in a gradation area in which the dot density of the first dot is rare, not only the change in the density of the first dot becomes gradual, but also the change in the density of the second dot becomes gradual, and becomes possible to suppress pseudo-outlines at locations where the dots change.

Furthermore, in each of the preferred embodiments, since the density per unit of said first dot is higher than that of said second dot, it is possible to control the characteristics of the first dot that has a high density per unit area and is visually prominent.

Further, in the first preferred embodiment and in the third preferred embodiment, since said second dot formation section carries out judgement of formation of dots using the error diffusion method, it is possible to carry out in concrete terms a judgment of formation of the second dot.

In addition, in the second preferred embodiment, in the fourth preferred embodiment, and in the fifth preferred embodiment, since said second dot formation section carries out judgment of formation of dots using the dither method using a second threshold value matrix prepared based on said threshold value matrix, it is possible to carry out in concrete terms a judgment of formation of the second dot.

Yet further, in each of the preferred embodiments, since the threshold values in said threshold value matrix are configured, when the dot density of a prescribed dot is less than a prescribed value, so that the frequency of occurrence of that prescribed dot becomes less compared to the frequency of occurrence of dots in a gradation area in which the dot density is average, by concretely setting the gradation area in which the dot density is rare, it is possible to make the frequency of occurrence of dots at positions at which dots occur that are likely to cause the occurrence of pseudo-outlines smaller than the frequency of occurrence in other regions, and it is possible to make gradual the change in the dot rate density of that dot and thereby suppressing pseudo-outlines.

In other words, when the threshold value is in a range from the smallest value up to a prescribed value, by making said threshold value matrix have a smaller share of the number of threshold values allocated, and by making small the constituent part at least in the area of small values of the threshold elements (the highlight area or the location where there is a change between low and high-density dots), it is possible to make small the rate of increase of dots in the area in which the pixels of interest start to appear, thereby making sudden changes in the dot rate at the location where there is a change in the dots.

Further, since the threshold values in said threshold value matrix are configured, in the fifth preferred embodiment, when the dot density of a prescribed dot is less than a prescribed value, so that the frequency of occurrence of that prescribed dot becomes less compared to the frequency of occurrence of dots in a gradation area in which the dot density is average, by concretely setting the gradation area in which the dot density is dense, it is possible to make the frequency of occurrence of dots at positions at which dots occur that are likely to cause the occurrence of pseudo-outlines smaller than the frequency of occurrence in other regions, and it is possible to make gradual the change in the dot rate density of that dot and thereby suppressing pseudo-outlines.

In other words, when the threshold value is in a range from the largest value up to a prescribed value, by making said threshold value matrix have a smaller share of the number of threshold values allocated, and by making small the constituent part at least in the area of large values of the threshold elements (the shadow area or the location where there is a change between low and high-density dots), it is possible to make small the rate of increase of dots in the area in which the pixels of interest start to appear, thereby making sudden changes in the dot rate at the location where there is a change in the dots.

In addition, in each of the preferred embodiments, since said thresh old value matrix is a threshold value matrix of the dot dispersion type, it becomes difficult to form the second dot in the periphery of the first dot.

Further, in the case when the threshold value matrix is of the dot fattening type, if a dot formation was done in the first dot formation determining section, it becomes easy to form the second dot in the periphery of the first dot.

From the above, it is possible to suppress the occurrence of pseudo-outlines by adjusting the rate of increase of dots at locations where pseudo-outlines can occur easily, and as a result it is possible to make the dot dispersion satisfactory and to form images with a high image quality.

Further, at the time of determining the dot rates of two or more types of dots with differing densities per unit area (for example, high-density dots and low-density dots), it is possible to control the respective dot rates without having to determine the dot rates independently for each type, and it is possible to make smooth the change between dots without complex operations.

Further, even according to the image forming method and image forming program of the present preferred embodiment, it is possible to obtain the same operational effects as the operational effects of said image forming apparatus.

Furthermore, the present invention need not be restricted to the preferred embodiments described above but various improvements and design modifications can be carried out without deviating from the intent and scope of the present invention.

For example, it is possible to change the output values and result values in each of the above preferred embodiments according to the number of bits and the number of quantization gradations that are processed. Further, the output value is dependent on the output system. For example, it is also possible to quantify four or more values.

Further, in each of the above preferred embodiments, the values in the threshold matrix were compressed in order to match the resolution of the threshold value matrix with the input gradation values, it is not necessary to restrict to this, and it is possible, on the contrary, to make the settings so as to match the input gradation values with the threshold value matrix. In this case, it is possible to expand the 8-bit input values into 12-bit values such as 0→0, 1→16, 2→32, etc., and to carry out the halftone processing by comparing those input values with the converted threshold value matrix of FIG. 6. Even when this is done, the same results as by the method described above will be obtained.

As explained in the above embodiments, the object of the present invention can be achieved by the following structures.
(1) An image forming apparatus that forms images using distributions of two or more types of dots with different densities per unit area within the same hue, with said apparatus having the feature that it is provided with;
a threshold value matrix is provided having a size of a prescribed region smaller than the input image;
a dot formation determining section that carries out, by comparing the pixel value at the target pixel in the input image and the threshold value at the corresponding position in said threshold value matrix, and based on the result of that comparison, the judgment of whether to form or not to form any one of the dots among two or more types of dots with different densities per unit area at a position corresponding to said target pixel; and
the threshold values in said threshold value matrix are configured so that the frequency of dot occurrence is lower for the gradation regions in which the density of any of said two or more types of dots with different densities is rare and/or dense is lower than the frequency of occurrence in the gradation regions in which the dot density is average.

According to the above structure, by making the frequency of occurrence of dots at positions at which dots occur that are likely to cause the occurrence of pseudo-outlines smaller than the frequency of occurrence in other regions, it is possible to make gradual the change in the dot rate density of that dot and to suppress pseudo-outlines.

(2) An image forming apparatus according to structure (1) above with the feature that said dot formation determining section is provided with a first dot formation determining section that judges whether or not to form the first dot by comparing said pixel value with the threshold value at the corresponding position in said threshold value matrix, and a second dot formation determining section that judges whether or not to form said second dot at the position at which it was judged not to form said first dot.

According to the above structure (2), by adjusting the frequency of dot occurrence of in the gradation region in which the dot density of the first dot is rare, it is possible not only to make the density of the first dot change gradually but also to make the density of the second dot change gradually, thereby making it possible to suppress pseudo-outlines where the dots change.

(3) An image forming apparatus according to structure (1) above with the feature that said dot formation determining section is provided with a selection section that selects the first dot formation determining section if said pixel value is above a prescribed value and selects the second dot formation determining section if said pixel value is below a prescribed value;
whereas said first dot formation determining section judges whether to form the first dot or to form the second dot by comparing said pixel value with the threshold value at the corresponding position in said threshold value matrix; and
said second dot formation determining section judges whether or not to form said second dot.

According to the above structure (2), by adjusting the frequency of dot occurrence of in the gradation region in which the dot density of the first dot is rare, it is possible not only to make the density of the first dot change gradually but also to make the density of the second dot change gradually, thereby making it possible to suppress pseudo-outlines where the dots change.

(4) An image forming apparatus according to structure (2) or structure (3) above with the feature that the density per unit area of said first dot is higher than that of said second dot.

According to the above structure (4), it is possible to control the characteristics of the first dot which has a high density per unit area and which stands out visually.

(5) An image forming apparatus according to any one of structures (2) to (4) above with the feature that said second dot formation determining section carries out judgment of dot formation using the error diffusion method.

According to the above structure (5), since said second dot formation determining section carries out judgment of dot formation using the error diffusion method, it is possible to carry out the judgment of formation of the second dot in a concrete manner.

(6) An image forming apparatus according to any one of structures (2) to (4) above with the feature that said second dot formation determining section carries out judgment of dot formation using a second threshold value matrix prepared based on said threshold value matrix.

According to the above structure (6), since said second dot formation determining section carries out judgment of dot formation using a second threshold value matrix prepared based on said threshold value matrix, it is possible to carry out the judgment of formation of the second dot in a concrete manner.

(7) An image forming apparatus according to any one of structures (1) to (6) above with the feature that, when the dot density of a specific dot is less than a prescribed value, the threshold values in said threshold value matrix are configured so that the frequency of occurrence of that specific dot is lower than the frequency of occurrence of dots in the gradation regions in which the dot density is average.

According to the above structure (7), by setting in concrete terms the gradation region in which the dot density is rare, it is possible to make the frequency of occurrence of dots at the concrete positions at which dots occur that are likely to cause the occurrence of pseudo-outlines smaller than the frequency of occurrence in other regions, and it is possible to make gradual the change in the dot rate density of that dot and to suppress pseudo-outlines.

(8) An image forming apparatus according to any one of structures (1) to (7) above with the feature that, when the dot density of a specific dot is larger than a prescribed value, the threshold values in said threshold value matrix are configured so that the frequency of occurrence of that specific dot is lower than the frequency of occurrence of dots in the gradation regions in which the dot density is average.

According to the above structure (8), by setting in concrete terms the gradation region in which the dot density is dense, it is possible to make the frequency of occurrence of dots at the concrete positions at which dots occur that are likely to cause the occurrence of pseudo-outlines smaller than the frequency of occurrence in other regions, and it is possible to make gradual the change in the dot rate density of that dot and to suppress pseudo-outlines.

(9) An image forming apparatus according to structures (1) to (8) above with the feature that said threshold value matrix is a threshold value matrix of the dot dispersion type.

According to the above structure (9), since said threshold value matrix is a threshold value matrix of the dot dispersion type, it becomes difficult to form the second dot in the periphery of the first dot.

(10) An image forming apparatus according to structure (1) to (8) above with the feature that said threshold value matrix is a threshold value matrix of the dot fattening type.

According to the above structure (10), since said threshold value matrix is a threshold value matrix of the dot fattening type, it becomes easy to form the second dot in the periphery of the first dot.

(11) An image forming method of forming images using distributions of two or more types of dots with different densities per unit area within the same hue, with said method having the feature that;

a threshold value matrix is prepared having a size of a prescribed region smaller than the input image;

a dot formation determining step of carrying out, by comparing the pixel value at the target pixel in the input image and the threshold value at the corresponding position in said threshold value matrix, and based on the result of that comparison, the judgment of whether to form or not to form any one of the dots among two or more types of dots with different densities per unit area at a position corresponding to said target pixel; and the threshold values in said threshold value matrix are configured so that the frequency of dot occurrence is lower for the gradation regions in which the density of any of said two or more types of dots with different densities is rare and/or dense is lower than the frequency of occurrence in the gradation regions in which the dot density is average.

(12) An image forming method according to structure (11) above with the feature that said dot formation determining step is provided with a first dot formation determining step of judging whether or not to form the first dot by comparing said pixel value with the threshold value at the corresponding position in said threshold value matrix, and a second dot formation determining step of judging whether or not to form said second dot at the position at which it was judged not to form said first dot.

(13) An image forming method according to structure (11) above with the feature that said dot formation determining step is provided with a selection step of selecting the first dot formation determining step if said pixel value is above a prescribed value and selecting the second dot formation determining step if said pixel value is below a prescribed value;

in said first dot formation determining step a judgment is made as to whether to form the first dot or to form the second dot by comparing said pixel value with the threshold value at the corresponding position in said threshold value matrix; and in said second dot formation determining step a determining is made as to whether or not to form said second dot.

(14) An image forming method according to structure (12) or structure (13) above with the feature that the density per unit area of said first dot is higher than that of said second dot.

(15) An image forming method according to any one of structures (12) to (14) above with the feature that in said second dot formation determining step a judgment is carried out of judging the dot formation using the error diffusion method.

(16) An image forming method according to any one of structures (12) to (14) above with the feature that in said second dot formation determining step a judgment of dot formation is made using a second threshold value matrix prepared based on said threshold value matrix.

(17) An image forming method according to any one of structures (11) to (16) above with the feature that, when the dot density of a specific dot is less than a prescribed value, the threshold values in said threshold value matrix are configured so that the frequency of occurrence of that specific dot is lower than the frequency of occurrence of dots in the gradation regions in which the dot density is average.

(18) An image forming method according to any one of structures (11) to (17) above with the feature that, when the dot density of a specific dot is larger than a prescribed value, the threshold values in said threshold value matrix are configured so that the frequency of occurrence of that specific dot is lower than the frequency of occurrence of dots in the gradation regions in which the dot density is average.

(19) An image forming method according to any one of structures (11) to (18) above with the feature that said threshold value matrix is a threshold value matrix of the dot dispersion type.

(20) An image forming method according to any one of structures (12) to (18) above with the feature that said threshold value matrix is a threshold value matrix of the dot fattening type.

(21) An image forming program with the feature that, in an image forming apparatus that forms images using distributions of two or more types of dots with different densities per unit area within the same hue, said program is provided with a threshold value matrix having a size of a prescribed region smaller than the input image;

a dot formation determining function is realized that carries out, by comparing the pixel value at the target pixel in the input image and the threshold value at the corresponding position in said threshold value matrix, and based on the result of that comparison, the judgment of whether to form or not to form any one of the dots among two or more types of dots with different densities per unit area at a position corresponding to said target pixel; and the threshold values in said threshold value matrix are configured so that the frequency of dot occurrence is lower for the gradation regions in which the density of any of said two or more types of dots with different densities is rare and/or dense is lower than the frequency of occurrence in the gradation regions in which the dot density is average.

According to the present invention, since it is possible to change the inclination of the rate of increase of dots generated due to the threshold matrix, it is possible to suppress the occurrence of pseudo-outlines by adjusting the rate of increase of dots at locations where pseudo-outlines can occur easily, and as a result, it is possible to make the dot dispersion satisfactory and to form images with a high image quality.

Further, at the time of determining the dot rates of two or more types of dots with differing densities per unit area (for example, high-density dots and low-density dots), it is possible to control the respective dot rates without having to determine the dot rates independently for each type, and it is possible to make smooth the change between dots without complex operations.

What is claimed is:

1. An image forming apparatus, for forming an image with using distributions of two or more types of dots having different densities per unit area in a same hue, comprising: a threshold value matrix having a size of a prescribed region smaller than an input image; and a dot formation determining section for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining section comprises: a first dot formation determining section for comparing the pixel value with the threshold value allocated at a position corresponding to the target pixel, and determining whether to form a first type of dot among the two or more types of dots; and a second dot formation determining section for determining whether or not to form a second type of dot among the two or more types of dots at a position where the first dot formation determining section has determined not to form the first type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level.

2. An image forming apparatus, for forming an image with using distributions of two or more types of dots having different densities per unit area in a same hue, comprising: a threshold value matrix having a size of a prescribed region smaller than an input image; and a dot formation determining section for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining section comprises: a selection section which selects a first dot formation determining section if the pixel value is not less than a prescribed value, and selects a second dot formation determining section if the pixel value is smaller than the prescribed value, wherein a first dot formation determining section compares the pixel value with the threshold value allocated at a position corresponding to the target pixel, and determines whether to form a first type of dot or to form a second type of dot among the two or more types of dots; and a second dot formation determining section determines whether to form the second type of dot and whether not to form any type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level.

3. The image forming apparatus of claim 1, wherein a density per unit area of the first type of dot is higher than a density per unit area of the second type of dot.

4. The image forming apparatus of claim 2, wherein a density per unit area of the first type of dot is higher than a density per unit area of the second type of dot.

5. The image forming apparatus of claim 1, wherein the second dot formation determining section carries out judgment of dot formation using the error diffusion method.

6. The image forming apparatus of claim 2, wherein the second dot formation determining section carries out judgment of dot formation using the error diffusion method.

7. The image forming apparatus of claim 1, wherein the second dot formation determining section carries out judgment of dot formation using a second threshold value matrix prepared based on the threshold value matrix.

8. The image forming apparatus of claim 2, wherein the second dot formation determining section carries out judgment of dot formation using a second threshold value matrix prepared based on the threshold value matrix.

9. An image forming method to form an image utilizing an image forming apparatus for forming an image using distributions of two or more types of dots having different densities per unit area in a same hue, the image forming method comprising:

a step of forming a threshold value matrix having a size of a prescribed region smaller than an input image; and a dot formation determining step for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining step comprises:

a first dot formation determining step for comparing the pixel value with the threshold value allocated at a position corresponding to the target pixel, and determining whether to form a first type of dot among the two or more types of dots; and a second dot formation determining step for determining whether or not to form a second type of dot among the two or more types of dots at a position where the first dot formation determining step has determined not to form the first type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level, wherein, each step is performed by utilizing an image forming apparatus.

10. An image forming method to form an image by utilizing an image forming apparatus for forming an image with using distributions of two or more types of dots having different densities per unit area in a same hue, the image forming method comprising:

a step of forming a threshold value matrix having a size of a prescribed region smaller than an input image; and a dot formation determining step for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining step comprises:

a selection step to select a first dot formation determining step if the pixel value is not less than a prescribed value, and to select a second dot formation determining step if the pixel value is smaller than the prescribed value, wherein a first dot formation determining step compares the pixel value with the threshold value allocated at a position corresponding to the target pixel, and determines whether to form a first type of dot or to form a second type of dot among the two or more types of dots; and a second dot formation determining step determines whether to form the second type of dot and whether not to form any type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level, wherein, each step is performed by utilizing an image forming apparatus.

11. The image forming method of claim 9, wherein a density per unit area of the first type of dot is higher than a density per unit area of the second type of dot.

12. The image forming method of claim 10, wherein a density per unit area of the first type of dot is higher than a density per unit area of the second type of dot.

13. The image forming method of claim 9, wherein the second dot formation determining section carries out judgment of dot formation using the error diffusion method.

14. The image forming method of claim 10, wherein the second dot formation determining section carries out judgment of dot formation using the error diffusion method.

15. The image forming method of claim 9, wherein the second dot formation determining section carries out judgment of dot formation using a second threshold value matrix prepared based on the threshold value matrix.

16. The image forming method of claim 10, wherein the second dot formation determining section carries out judgment of dot formation using a second threshold value matrix prepared based on the threshold value matrix.

17. A computer-readable storage medium having stored therein a program configured to allow an image forming apparatus, which forms an image with using distributions of two or more types of dots having different densities per unit area in a same hue, to execute the functions comprising: preparing a threshold value matrix having a size of a prescribed region smaller than an input image; and a dot formation determining function for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining function comprises: a first dot formation determining function for comparing the pixel value with the threshold value allocated at a position corresponding to the target pixel, and determining whether to form a first type of dot among the two or more types of dots; and a second dot formation determining function for determining whether or not to form a second type of dot among the two or more types of dots at a position where the first dot formation determining function has determined not to form the first type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is in average level.

18. A computer-readable storage medium having stored therein a program configured to allow an image forming apparatus, which forms an image with using distributions of two or more types of dots having different densities per unit area in a same hue, to execute the functions comprising: preparing a threshold value matrix having a size of a prescribed region smaller than an input image; and a dot formation determining function for carrying out comparison between a pixel value at a target pixel in the input image and a threshold value allocated at a position corresponding to the target pixel in the threshold value matrix, and for determining, based on a result of the comparison, whether to form or not to form any one of the two or more types of dots having different densities per unit area at the position corresponding to the target pixel, wherein, the dot formation determining function comprises: a selection function to select a first dot formation determining function if the pixel value is not less than a prescribed value, and to select a second dot formation determining function if the pixel value is smaller than the prescribed value, wherein a first dot formation determining function compares the pixel value with the threshold value allocated at a position corresponding to the target pixel, and determines whether to form a first type of dot or to form a second type of dot among the two or more types of dots; and a second dot formation determining function determines whether to form the second type of dot and whether not to form any type of dot, wherein, threshold values in the threshold value matrix are configured so that a frequency of dot formation is lower, for gradation regions in which a dot density of any of the two or more types of dots having different densities is low and/or high, than a frequency of dot formation for gradation regions in which the dot density is an average level.

19. The computer-readable storage medium of claim 17, wherein a density per unit area of the first type of dot is higher than a density per unit area of the second type of dot.

20. The computer-readable storage medium of claim 18, wherein a density per unit area of the first type of dot is higher than a density per unit area of the second type of dot.

* * * * *